United States Patent
Kim et al.

(10) Patent No.: US 11,237,650 B2
(45) Date of Patent: Feb. 1, 2022

(54) ELECTRONIC DEVICE FOR CHARGING BATTERY OF EXTERNAL ELECTRONIC DEVICE AND METHOD THEREOF

(71) Applicant: Samsung Electronics Co., Ltd., Gyeonggi-do (KR)

(72) Inventors: Yongwoon Kim, Gyeonggi-do (KR); Jinwan An, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/431,968

(22) Filed: Jun. 5, 2019

(65) Prior Publication Data

US 2020/0012353 A1 Jan. 9, 2020

(30) Foreign Application Priority Data

Jul. 9, 2018 (KR) .......................... 10-2018-0079349

(51) Int. Cl.
  *G06F 3/038* (2013.01)
  *G06F 3/0354* (2013.01)
  *H02J 7/00* (2006.01)
  *H02J 7/02* (2016.01)

(52) U.S. Cl.
  CPC .......... *G06F 3/038* (2013.01); *G06F 3/03545* (2013.01); *H02J 7/007* (2013.01); *H02J 7/0047* (2013.01); *H02J 7/025* (2013.01)

(58) Field of Classification Search
  CPC ................................................... G06F 3/038
  See application file for complete search history.

(56) References Cited

U.S. PATENT DOCUMENTS

| | | | |
|---|---|---|---|
| 7,522,158 B2 * | 4/2009 | Carlson | G06F 1/1626 345/179 |
| 7,868,873 B2 | 1/2011 | Palay et al. | |
| 8,022,937 B2 | 9/2011 | Palay et al. | |
| 8,094,133 B2 | 1/2012 | Sato et al. | |
| 8,094,140 B2 | 1/2012 | Katsurahira et al. | |
| 8,102,382 B2 | 1/2012 | Palay et al. | |
| 8,362,910 B2 | 1/2013 | Lee | |
| 8,373,683 B2 | 2/2013 | Katsurahira et al. | |
| 9,177,503 B2 * | 11/2015 | Lynch | G09G 3/3225 |
| 9,229,517 B2 | 1/2016 | Narayanan et al. | |
| 9,916,019 B2 | 3/2018 | Lee et al. | |

(Continued)

OTHER PUBLICATIONS

International Search Report dated Sep. 20, 2019.
European Search Report dated May 11, 2021.

*Primary Examiner* — William Boddie
*Assistant Examiner* — Bipin Gyawali
(74) *Attorney, Agent, or Firm* — Cha & Reiter, LLC

(57) ABSTRACT

An electronic device include a housing, a touchscreen display viewable through a portion of the housing, a wireless communication circuitry disposed inside the housing, a processor disposed inside the housing and operatively connected to the touchscreen display and the wireless communication circuitry, and a memory operatively connected to the processor. The memory stores instructions that, when executed, cause the processor to receive a first signal indicating a charging state of a battery from an external electronic device including the battery through the wireless communication circuitry, and to provide a user interface corresponding to charging of the battery, based at least partially on the first signal.

16 Claims, 19 Drawing Sheets

(56) References Cited

U.S. PATENT DOCUMENTS

| | | | |
|---|---|---|---|
| 10,298,051 B2 | 5/2019 | Yuan et al. | |
| 10,564,736 B2 | 2/2020 | Lee et al. | |
| 2007/0177533 A1 | 8/2007 | Palay et al. | |
| 2008/0181143 A1 | 7/2008 | Palay et al. | |
| 2010/0066693 A1 | 3/2010 | Sato et al. | |
| 2010/0277327 A1* | 11/2010 | Lee | G06F 3/046 340/636.16 |
| 2010/0321288 A1 | 12/2010 | Katsurahira et al. | |
| 2010/0328249 A1* | 12/2010 | Ningrat | G06F 3/046 345/174 |
| 2011/0298421 A1 | 12/2011 | Palay et al. | |
| 2013/0106723 A1* | 5/2013 | Bakken | G06F 3/03545 345/173 |
| 2015/0049052 A1* | 2/2015 | Atkinson | G06F 3/03545 345/174 |
| 2015/0185800 A1* | 7/2015 | Narayanan | G06F 1/32 345/173 |
| 2016/0125718 A1* | 5/2016 | Feng | G08B 3/10 340/686.6 |
| 2016/0299585 A1 | 10/2016 | Lee et al. | |
| 2016/0320830 A1* | 11/2016 | Jakoboski | G06F 3/03545 |
| 2017/0338682 A1* | 11/2017 | Yuan | H02J 50/10 |
| 2019/0278390 A1* | 9/2019 | Chiang | G06F 1/1684 |

\* cited by examiner

ELECTRONIC DEVICE FOR CHARGING BATTERY OF EXTERNAL ELECTRONIC DEVICE AND METHOD THEREOF

CROSS-REFERENCE TO RELATED APPLICATION(S)

This application is based on and claims priority under 35 U.S.C. § 119 to Korean Patent Application No. 10-2018-0079349, filed on Jul. 9, 2018, in the Korean Intellectual Property Office, the disclosure of which is incorporated by reference herein its entirety.

BACKGROUND

1. Field

The disclosure generally relates to an electronic device for charging a battery of an external electronic device and a method thereof.

2. Description of Related Art

An electronic device may provide an environment where an external electronic device (e.g., a pen input device) operates to input handwriting or other input on the display of the electronic device. The electronic device may receive the input, such as a drawing input, a button selection input, a hovering input, or an erasing input, from the external electronic device via various technologies such as electromagnetic induction or wireless communication. For example, when the electronic device transmits a signal to the external electronic device by using an electromagnetic induction panel, the external electronic device may transmit, to the electronic device, a signal induced through a resonance circuitry. The electronic device may sense at least one of the position, the pressure, or the input form of the external electronic device by using the resonance frequency of the induced signal.

The above information is presented as background information only to assist with an understanding of the disclosure. No determination has been made, and no assertion is made, as to whether any of the above might be applicable as prior art with regard to the disclosure.

SUMMARY

The above-described external electronic device may be equipped with a battery to power its operations so that it can generate signals of various specified resonance frequencies or wirelessly communicate with the electronic device. When the battery capacity of the external electronic device is not sufficient, the external electronic device may unexpectedly be rendered inoperable, which may cause inconvenience to the user.

Conventionally, the battery of the above-described external electronic device is charged by a separate charging device, such as a power adapter. But when the battery of the external electronic device is charged through the separate charging device, the user has to carry the separate charging device, which may inconvenience the user. In addition, the user may not be able to use the external electronic device during charging, which may cause additional inconvenience. In another charging scheme, a charging component may be added to the electronic device so that it may charge the external electronic device. But when the charging component is added to the electronic device, the mounting space within the electronic device for other components may be reduced. Further, although the electromagnetic induction panel mounted in the electronic device may transmit a signal, conductive lines included in the electromagnetic induction panel are configured to receive inputs of the external electronic device. Therefore, charging efficiency may be degraded due to the number or the thickness of the coils constituting the conductive line. In addition, while the electronic device charges the battery by using the electromagnetic induction panel, the electronic device may not receive inputs from the external electronic device.

Aspects of the disclosure are to address at least the above-mentioned problems and/or disadvantages and to provide at least the advantages described below. Accordingly, an aspect of the disclosure is to provide a method for charging the battery of an external electronic device by using existing components of an electronic device.

In accordance with an aspect of the disclosure, an electronic device may include a housing, a touchscreen display viewable through a portion of the housing, a wireless communication circuitry disposed inside the housing, a processor disposed inside the housing and operatively connected to the touchscreen display and the wireless communication circuitry, and a memory operatively connected to the processor. The memory may store instructions that, when executed, cause the processor to receive a first signal indicating a charging state of a battery from an external electronic device including the battery through the wireless communication circuitry, and to provide a user interface corresponding to charging of the battery, based at least partially on the first signal.

In accordance with another aspect of the disclosure, a method of an electronic device may include receiving a first signal indicating a charging state of a battery from an external electronic device including the battery and providing a user interface corresponding to charging of the battery, based at least partially on the first signal.

In accordance with another aspect of the disclosure, an electronic device may include a housing including a first plate and a second plate facing in a direction opposite to a direction of the first plate, a touchscreen display panel viewable through at least a portion of the first plate, a wireless communication circuitry disposed inside the housing, a conductive coil included in the touchscreen display panel or disposed adjacent to the display panel to generate an electromagnetic wave transmitted through the first plate, at least one processor operatively connected to the touchscreen display panel, the wireless communication circuitry, and the conductive coil, and a memory operatively connected to the processor. The memory may store instructions that, when executed, cause the processor to receive a first signal indicating a charging state of a battery from a stylus pen including the battery through the wireless communication circuitry, to provide a user interface corresponding to charging of the battery, based at least partially on the first signal, and to apply a current to the conductive coil, in response to detecting that the stylus pen is located at a position corresponding to the conductive coil.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

In the following description made with respect to the accompanying drawings, similar components will be assigned with similar reference numerals.

DETAILED DESCRIPTION

Hereinafter, certain embodiments of the disclosure may be described with reference to accompanying drawings. Accordingly, those of ordinary skill in the art will recognize that the disclosure is not limited to a specific embodiment, but modifications, equivalents, and/or alternatives on an embodiment in the disclosure can be variously made without departing from the scope and spirit of the disclosure.

Figure 1:
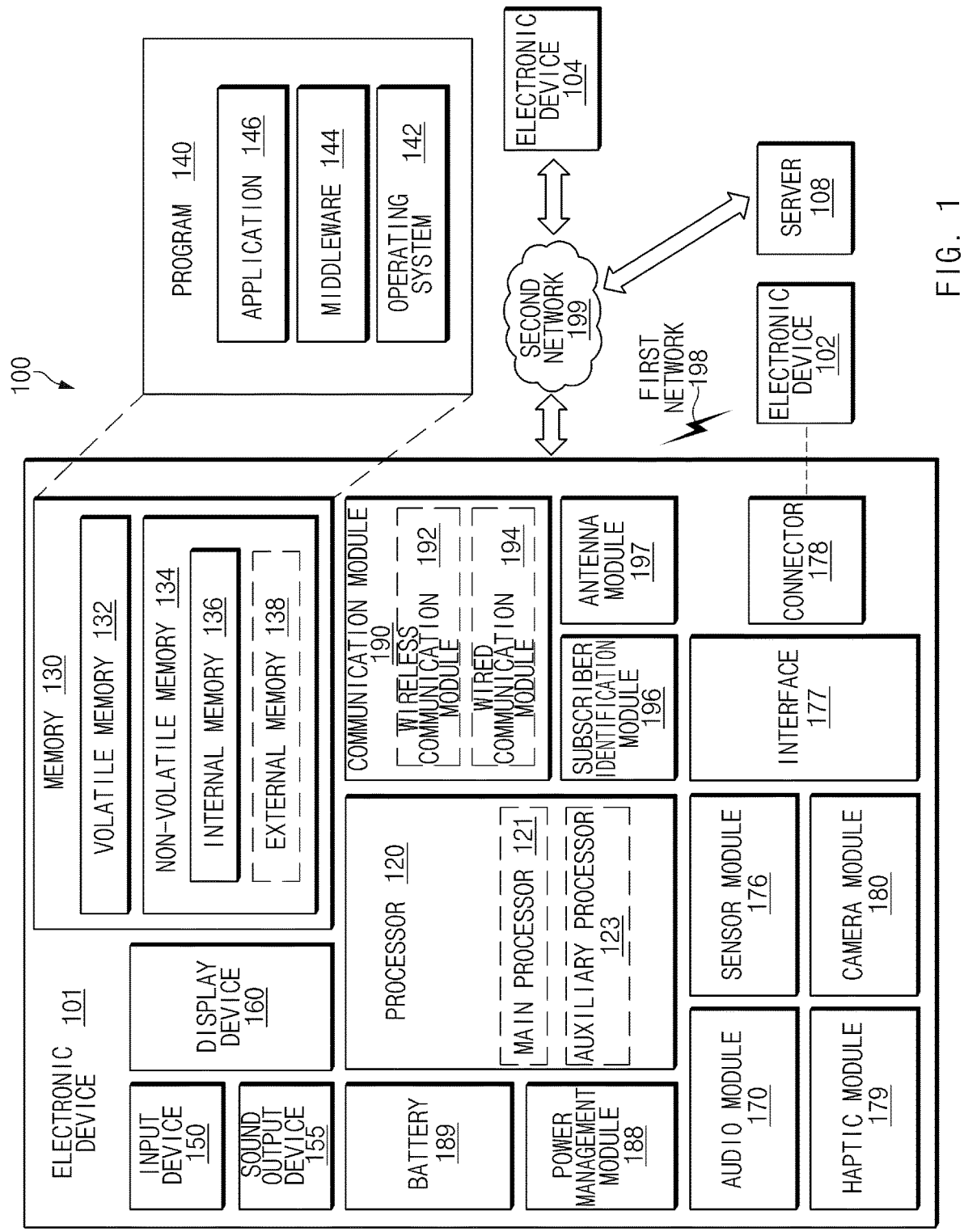
FIG. 1 is a block diagram illustrating an electronic device in a network environment according to certain embodiments.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
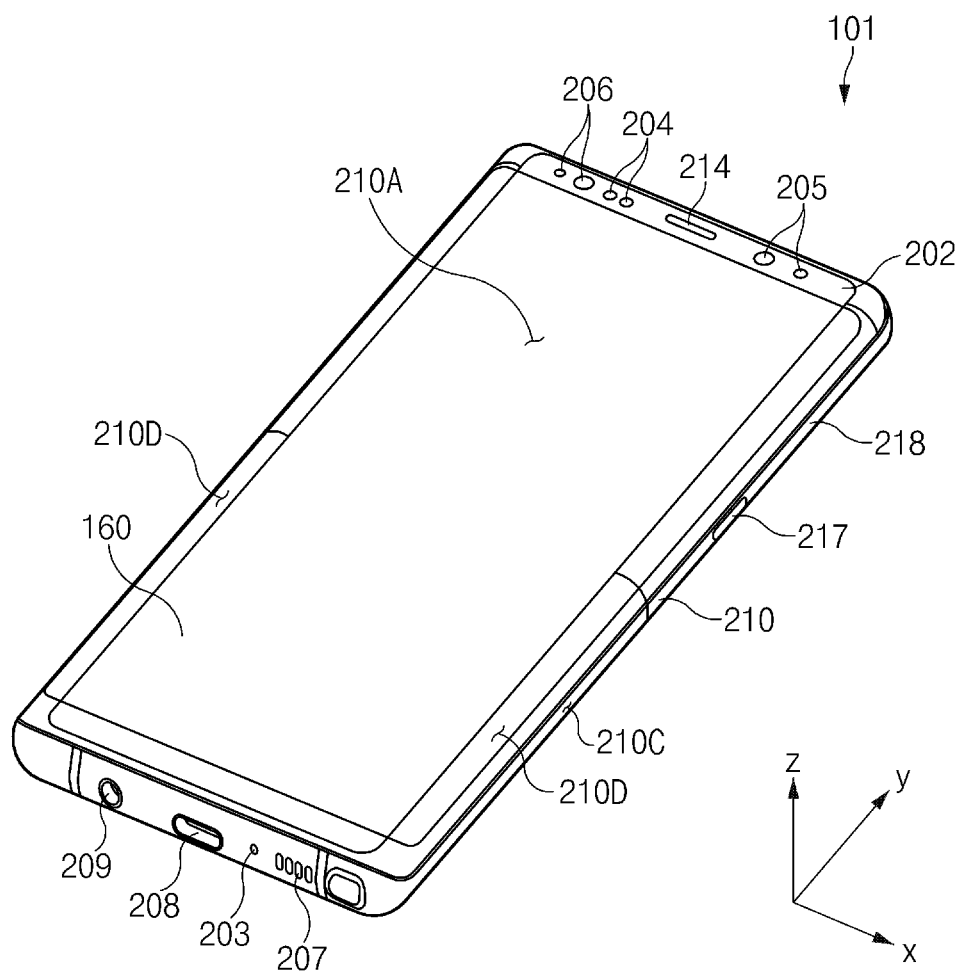
FIG. 2A is a perspective view illustrating a front surface of an electronic device, according to an embodiment.
Figure 2B:
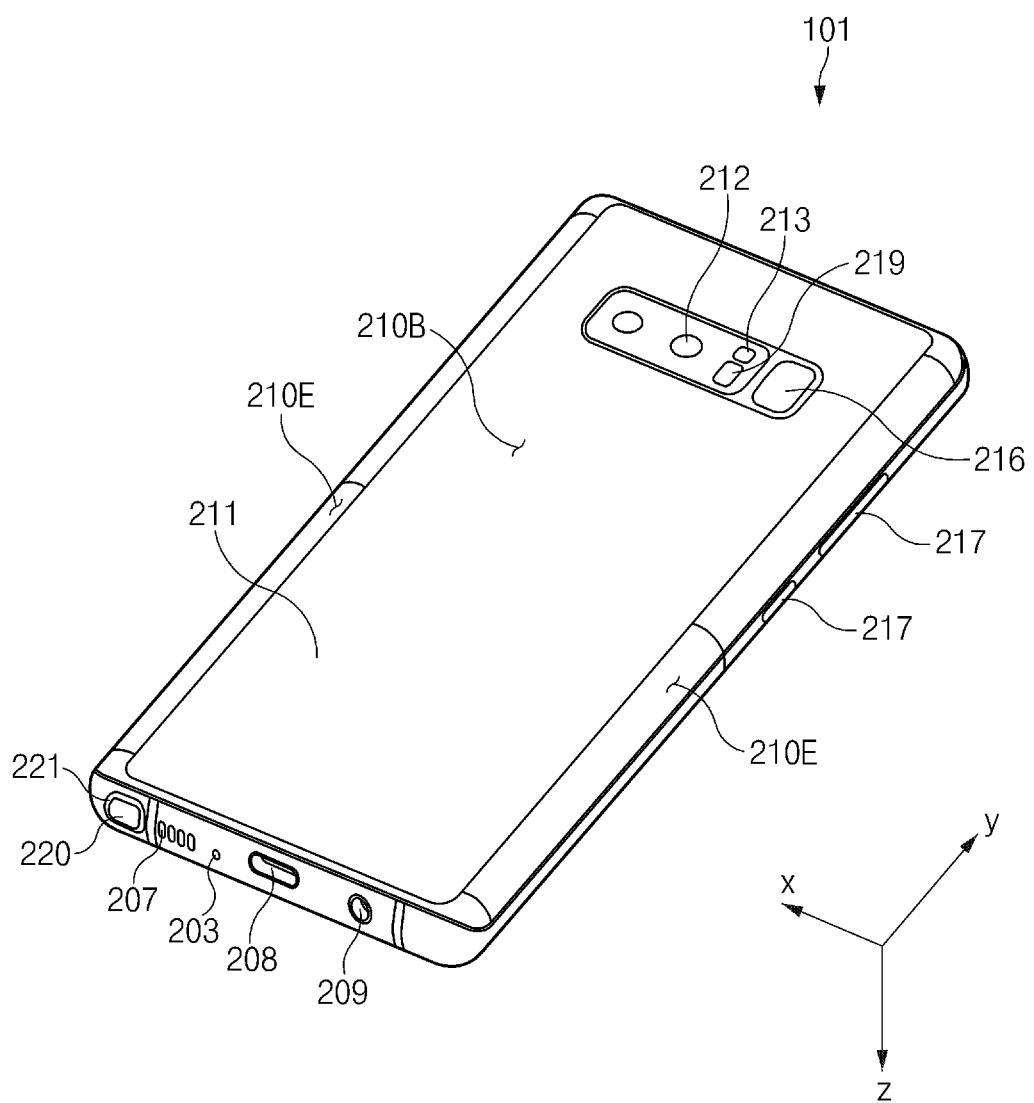
FIG. 2B is a perspective view illustrating a rear surface of the electronic device, according to an embodiment.

FIG. 2A is a perspective view illustrating a front surface of the electronic device 101, according to an embodiment, and FIG. 2B is a perspective view illustrating a rear surface of the electronic device 101, according to an embodiment.

Referring to FIGS. 2A and 2B, the electronic device 101 may include a housing 210 including a first surface 210A (or a front surface), a second surface 210B (or a rear surface), and a side surface 210C surrounding the space between the first surface 210A and the second surface 210B. In another embodiment (not illustrated), the housing may include only some of the first surface 210A, the second surface 210B, and the side surface 210C of FIG. 2A. According to an embodiment, the first surface 210A may have at least a portion including a front plate 202 that is substantially transparent (e.g., a glass plate or a polymer plate including various coating layers). The second surface 210B may include a rear plate 211 that is substantially opaque. The rear plate 211 may include, for example, coated or colored glass, ceramic, polymer, metal (e.g., aluminum, stainless steel (STS), or magnesium) or the combination of at least two of the above materials. The side surface 210C may include a side bezel structure (or "side member") 218 which is coupled to the front plate 202 and the rear plate 211, and includes metal and/or polymer. According to an embodiment, the rear plate 211 and the side bezel structure 218 may be integrally formed with each other and may include the same material (e.g., metal material such as aluminum).

According to an embodiment, in FIG. 2A, the front plate 202 may include two first areas 210D bent from the first surface 210A toward the rear plate 211 while seamlessly extending from opposing longitudinal edges of the front plate 202. According to an embodiment, in FIG. 2B, the rear plate 211 may include two second areas 210E bent from the second surface 210B toward the front plate 202 while seamlessly extending from opposing longitudinal edges of the rear plate 211. According to an embodiment, the front plate 202 (or the rear plate 211) may include only one of the first areas 210D (or the second areas 210E). Thus, some of the first areas 210D or the second areas 210E may not be included. According to an embodiment, when viewed from the side of the electronic device 101 (i.e. viewed along +x axis or −x axis), the side bezel structure 218 may have a first thickness (or width) where the first area 210D and/or the second area 210E are absent, and may have a second thickness thinner than the first thickness where the first areas 210D and/or the second areas 210E are present.

According to an embodiment, the electronic device 101 may include at least one of the display 160 (e.g., the display device 160 of FIG. 1), audio modules 203, 207, or 214 (e.g., the audio module 170 of FIG. 1), sensor modules 204, 216, and 219 (e.g., the sensor module 176 of FIG. 1), camera modules 205, 212, and 213 (e.g., the camera module 180 of FIG. 1), key input device 217 (e.g., at least a portion of the input device 150 of FIG. 1), light emitting device 206, external electronic device 220 (e.g., pen input device, stylus pen, or electronic pen), and connector holes 208 and 209. According to an embodiment, the electronic device 101 may omit at least one of components mentioned above (e.g., the key input device 217 or the light emitting device 206) or may additionally include other components.

The display 160 may be exposed, for example, through a substantial portion of the front plate 202. In an embodiment, at least a portion of the display 160 may be exposed through the first surface 210A and the first areas 210D of the side surface 210C. In an embodiment, the corners of the display 160 may be formed in the substantially same shape as those of the front plate 202, where the corners of the front plate 202 are adjacent to the corners of the display 160. In another embodiment (not illustrated), to expand the area in which the display 160 is exposed, the display 160 and the front plate 202 may be coterminous, such that the edges of the display 160 and the front plate 202 coincide.

According to another embodiment (not illustrated), a recess (or groove) or an opening may be formed in a portion of a screen display area of the display 160, and that portion of the screen display area of the display 160 may include at least one of the audio module 214 (e.g., the audio module 170 of FIG. 1), the sensor module 204 (e.g., the sensor module 176 of FIG. 1), the camera module 205 (e.g., the camera module 180 of FIG. 1), or the light emitting device 206. In another embodiment (not illustrated), the audio module 214, the sensor module 204, the camera module 205, the sensor module 216 (e.g., a fingerprint sensor), and the light emitting device 206 may be disposed behind the screen display area of the display 160 such that the screen display area of the display 160 overlaps with these components. In another embodiment, the display 160 may be coupled to or disposed adjacent to touch sensing circuitry, pressure sensor to measure the intensity (pressure) of touches, and/or a digitizer (e.g., an electromagnetic induction panel 390 of FIG. 3), to detect various inputs from a magnetic stylus pen (e.g., the external electronic device 220). In an embodiment, at least portions of the sensor modules 204 and 219 and/or at least a portion of the key input device 217 may be disposed in the first areas 210D and/or the second areas 210E.

According to an embodiment, the audio module 203, 207, 214 may include a microphone hole 203 and speaker holes 207 and 214. A microphone may be disposed in the microphone hole 203 so as to detect sound. In an embodiment, a plurality of microphones may be disposed in the microphone hole 203 so that they may directionally detect sound. The speaker holes 207 and 214 may include the external speaker hole 207 and the receiver hole 214, which enable phone conversations. In an embodiment, the speaker holes 207 and 214 and the microphone hole 203 may be implemented into one hole or a speaker (e.g., a piezoelectric speaker) may be included without the speaker holes 207 and 214.

In an embodiment, the sensor modules 204, 216, and 219 may generate electrical signals or data values corresponding to various internal operating states or various aspects of the external environment of the electronic device 101. The sensor modules 204, 216 and 219 may, for example, include the first sensor module 204 (e.g., a proximity sensor) and/or a second sensor module (not illustrated) (e.g., a fingerprint sensor) disposed on the first surface 210A of the housing 210. The sensor modules 204, 216 and 219 may further include the third sensor module 219 (e.g., a HRM sensor) and/or the fourth sensor module 216 (not illustrated) (e.g., a fingerprint sensor) disposed on the second surface 210B of the housing 210. The fingerprint sensor may be disposed on the second surface 210B as well as the first surface 210A (e.g., overlapping with the display 160) of the housing 210. The electronic device 101 may further include a sensor module which is not illustrated, such as at least one of a gesture sensor, a gyro sensor, a barometric sensor, a magnetic sensor, an acceleration sensor, a grip sensor, a color sensor, an infrared sensor, a biometric sensor, a temperature sensor, a humidity sensor, or an illuminance sensor 204.

The camera modules 205, 212 and 213 may include the first camera device 205 disposed on the first surface 210A of the electronic device 10, the second camera device 212 and/or a flash 213 disposed on the second surface 210B. The camera devices 205 and 212 may include one or a plurality of lenses, image sensor, and/or image signal processor. The flash 213 may include, for example, a light emitting diode or a xenon lamp. In an embodiment, two or more lenses (e.g. an infrared camera, a wide angle lens, and a telephoto lens) and image sensors may be disposed on one side of the electronic device 101.

The key input device 217 may be disposed on the side surface 210C of the housing 210. In another embodiment, the electronic device 101 may not include a hardware key input device 217 and the key input device 217 may instead be implemented as a soft key on the display 160. In another embodiment, the key input device may include the sensor module 216 disposed on the second surface 210B of the housing 210.

The light emitting device 206 may be, for example, disposed on the first surface 210A of the housing 210. The light emitting device 206 may provide, for example, notification information to the user. In another embodiment, the light emitting device 206 may provide, for example, a light source for the cameral module 205. The light emitting device 206 may include, for example, an LED, an IR LED, and a xenon lamp.

The connector holes 208 and 209 may include the first connector hole 208 to receive a connector (e.g., a USB connector) to transceive power and/or data from an external electronic device (e.g. a USB charger) and/or the second connector hole (e.g., an ear-phone jack) 209 to receive a connector to transceive an audio signal from another external electronic device (e.g. headphones).

The external electronic device 220 (e.g., a stylus pen) may be inserted into or detached from the housing 210 through a hole or recess 221 formed in the side surface of the housing 210, and may include a button to facilitate the detaching of the external electronic device 220. The external electronic device 220 may have resonance circuitry embedded therein to operate together with the electromagnetic induction panel 390 (e.g., a digitizer) included in the electronic device 101. The external electronic device 220 may support electromagnetic resonance (EMR), active electrical stylus (AES) scheme, and electric coupled resonance (ECR).

Figure 3:
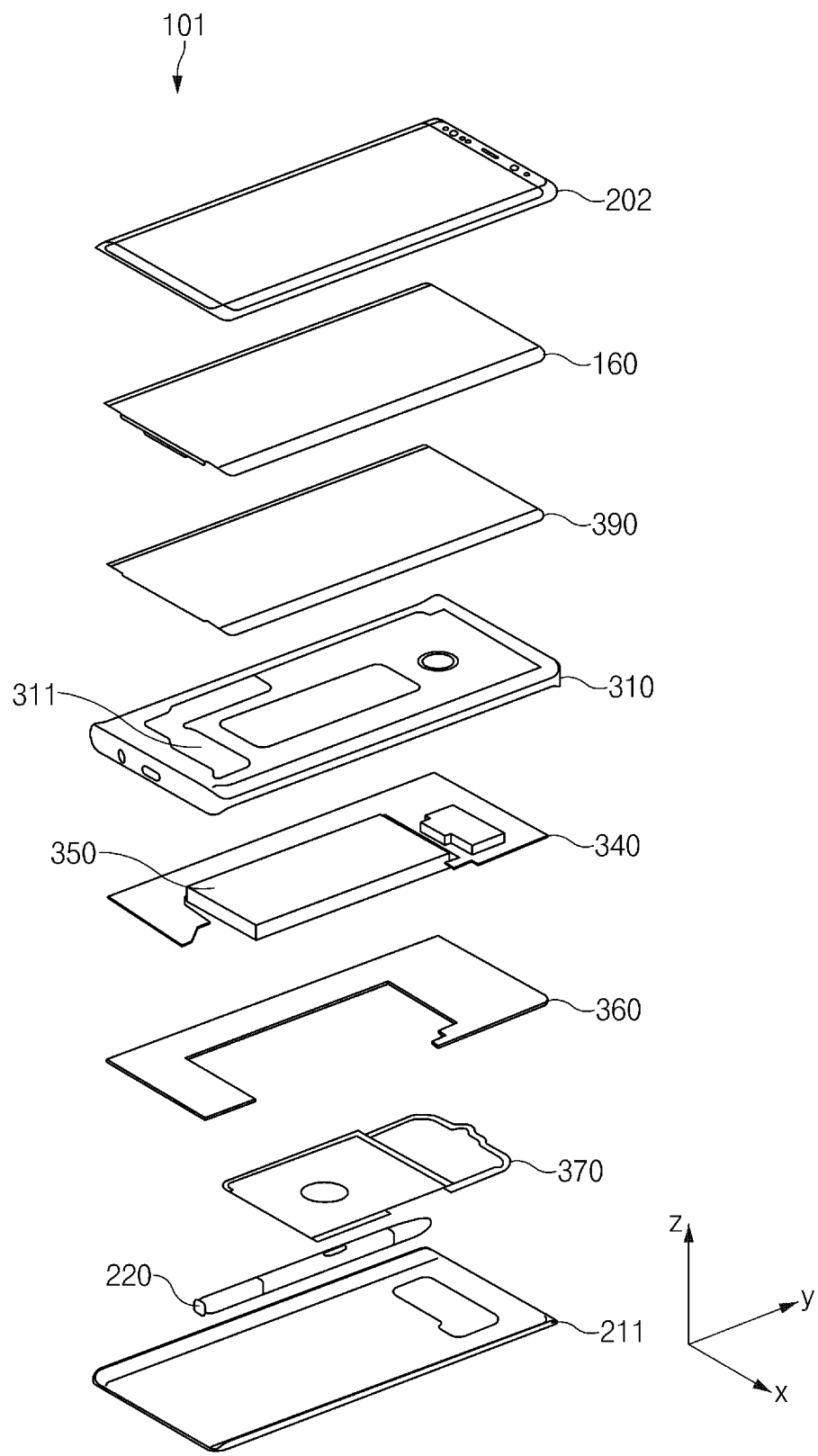
FIG. 3 is an exploded perspective view of the electronic device, according to an embodiment.

FIG. 3 is an exploded perspective view of the electronic device 101, according to an embodiment.

Referring to FIG. 3, the electronic device 101 may include a side bezel structure 310, a first support member 311 (e.g., a bracket), the front plate 202, the display 160, the electromagnetic induction panel 390, a printed circuitry board 340, a battery 350, a second support member 360 (e.g., rear case), an antenna 370 (e.g., an antenna module 197 of FIG. 1), the external electronic device 220, and a back plate 211. In an embodiment, the electronic device 101 may not include at least one of the above-described components (e.g., the first support member 311 or the second support member 360) or may additionally include other components. At least one of the components of the electronic device 101 may be the same to or similar to at least one of components of the electronic device 101 of FIG. 2A or 2B, and the redundant descriptions thereof will be omitted.

The electromagnetic induction panel 390 (e.g., a digitizer) may be a panel for sensing the input of the external electronic device 220. For example, the electromagnetic induction panel 390 may include a printed circuitry board (PCB) (e.g., a flexible printed circuitry board (FPCB)) and a shielding sheet. The shielding sheet may prevent the mutual interference between the electromagnetic induction panel 390 and other components. For example, interference may be caused by electromagnetic fields generated from the other components (e.g., a display module, a printed circuitry board, or an electromagnetic induction panel) included in the electronic device 101. The shielding sheet may suppress the electromagnetic field generated from the other components such that the input from the external electronic device 220 is more precisely transmitted to the coils of the electromagnetic induction panel 390. According to an embodiment, the electromagnetic induction panel 390 may include an opening formed in an area corresponding to a biometric sensor mounted in the electronic device 101.

The first support member 311 is disposed in the electronic device 101 to be coupled to the side bezel structure 310 or to be integrated with the side bezel structure 310. The first support member 311 may include, for example, a metal material and/or a non-metal material (e.g., polymer). The first support member 311 may have one surface coupled to the display 160 and the opposite surface may be coupled to the printed circuitry board 340. The printed circuitry board 340 may have components, which are illustrated in FIG. 1, embedded therein. For example, the processor 120, the memory 130, and/or the interface 177 may be mounted on the printed circuitry board 340. The processor 120 may include, for example, one or more of a central processing unit, an application processor, a graphic processing unit, an image signal processor, a sensor hub processor, or a communications processor. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The battery 350 may include a device to supply power to at least one component of the electronic device 101. For example, the battery 350 may include a non-rechargeable primary battery, or a rechargeable secondary battery, and/or a fuel cell. At least a portion of the battery 350 may be disposed on substantially the same plane as the printed circuitry board 340. The battery 350 may be integrally disposed inside the electronic device 101, and may be detachably disposed in the electronic device 101, i.e. the battery 350 may be disposed in such a way that the user may detach the battery 350 from the electronic device 101.

The antenna 370 may be interposed between the rear plate 211 and the battery 350. The antenna 370 may include, for example, a near field communication (NFC) antenna, a wireless charging antenna, and/or a magnetic secure transmission (MST) antenna. The antenna 370 may enable short-range communication with an external device and/or may wirelessly transceive power necessary for charging. In another embodiment, an antenna structure may be formed by a portion of the side bezel structure 310 and/or the first support member 311 or the combination of the side bezel structure 310 and the first support member 311.

Figure 4:
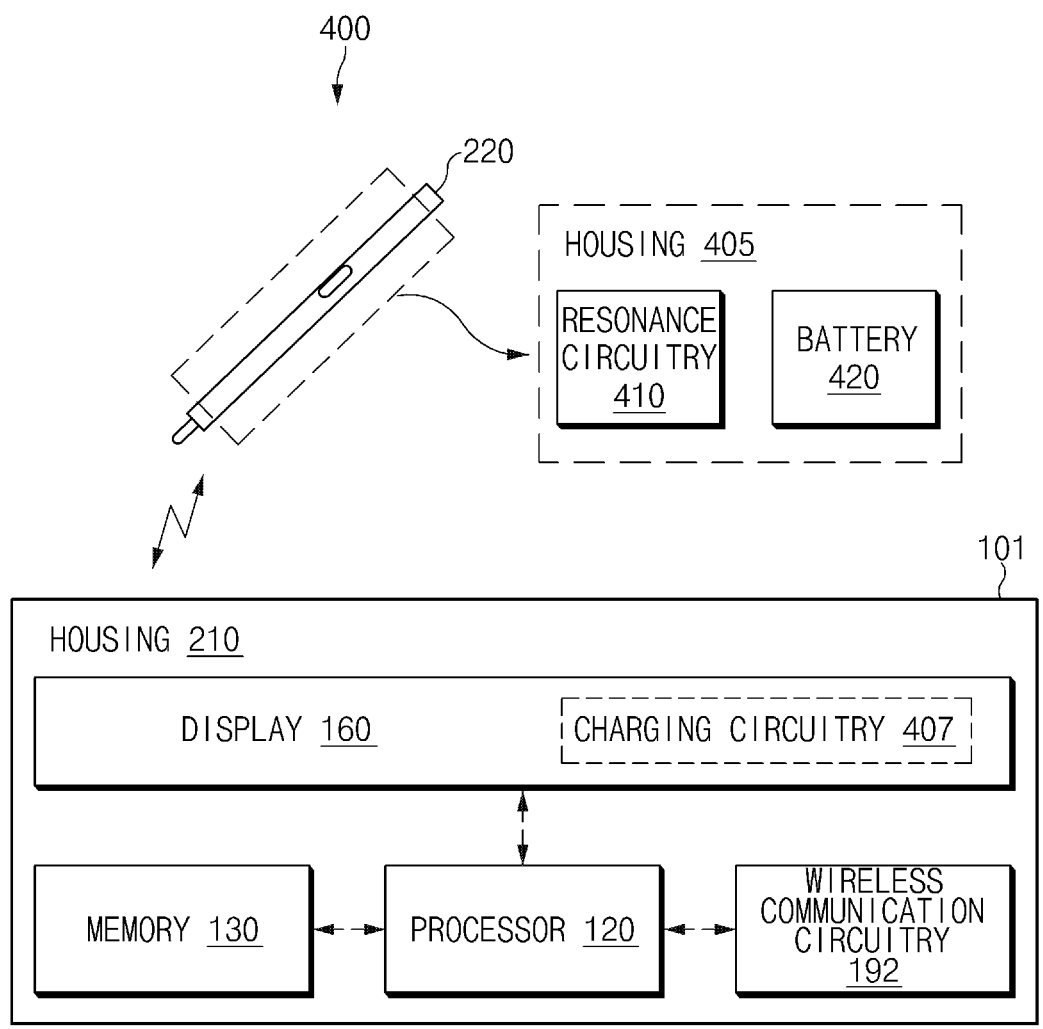
FIG. 4 illustrates a block diagram of the electronic device for charging a battery of the external electronic device, according to an embodiment.

FIG. 4 illustrates a block diagram of the electronic device 101 for charging a battery 420 of the external electronic device 220, according to an embodiment.

Referring to FIG. 4, the external electronic device 220 may include a resonance circuitry 410 and the battery 420 which are provided inside a housing 405.

According to an embodiment, the resonance circuitry 410 may include one or more electronic elements, such as a coil, an inductor, or a capacitor. The external electronic device 220 may generate a signal by using the resonance circuitry 410. For example, the external electronic device 220 may generate a signal by using at least one of EMR, AES, and ECR.

According to an embodiment, the electronic device 101 may include the housing 210, the display 160, the processor 120, the memory 130, and the wireless communication circuitry 192 (or a wireless communication module). According to an embodiment, the electronic device 101 may further include at least one other component in addition to the components illustrated in FIG. 4. For example, the electronic device 101 may further include the sound output device 155 of FIG. 1 inside the housing 210. As another example, the electronic device 101 may further include the electromagnetic induction panel 390 of FIG. 3, and the electromagnetic induction panel 390 may be integrally formed with the display 160 or be disposed adjacent to the display 160.

According to an embodiment, the display 160 may be visible through a portion of the housing 210. The display 160 may provide a graphic user interface (GUI).

According to an embodiment, the wireless communication circuitry 192 may be provided inside the housing 210 and may wirelessly communicate with a communication circuitry (not illustrated) of the external electronic device 220. For example, the wireless communication circuitry 192 may perform wireless communication based on Bluetooth low energy (BLE) protocol defined by the Bluetooth Special Interest Group (SIG).

According to an embodiment, the electronic device 101 may further include a charging circuitry 407 integrated with the display 160 or disposed adjacent to the display 160 to charge the battery 420 of the external electronic device 220. The charging circuitry 407 may include a conductive coil. To efficiently apply a current for charging the battery 420, the charging circuitry 407 may be included in a partial area of the display 160.

According to an embodiment, the processor 120 may be operatively connected with the display 160 and the wireless communication circuitry 192. The processor 120 may perform the overall function of the electronic device 101, and specifically operate to charge the battery 420 of the external electronic device 220.

According to an embodiment, the processor 120 may receive a first signal for indicating the charging state of the battery 420 of the external electronic device 220 through the wireless communication circuitry 192. The first signal may be, for example, transmitted through a communication circuitry (not illustrated) of the external electronic device 220 or may be transmitted using electromagnetic induction.

According to an embodiment, the processor 120 may provide a user interface for enabling charging of the battery 420, based at least partially on the first signal. For example, the processor 120 may display a GUI for enabling the charging of the battery 420 on the display 160. Alternatively, the processor 120 may control the sound output device 155 (e.g., a speaker) to output a sound.

According to an embodiment, the processor 120 may charge the battery 420 in response to sensing that the external electronic device 220 is positioned appropriately for the charging circuitry 407. For example, the processor 120 may identify the position of the external electronic device 220 based at least on a signal received from the external electronic device 220 via electromagnetic induction.

According to an embodiment, the processor 120 may receive a second signal for changing a charging mode of the battery 420 from the external electronic device 220, and may change the charging mode based at least partially on the second signal. According to an embodiment, the charging mode may include a first normal charging mode and a second charging mode for quick charge. For example, in the first charging mode, the processor 120 may apply a current to the charging circuitry 407 for a specified first time interval. In the second charging mode, the processor 120 may increase the amount of the current transmitted to the battery 420 by increasing the duration of the first time interval in which the current is applied to the charging circuitry 407.

According to an embodiment, the processor 120 may determine the position of the external electronic device 220 based at least partially on the third signal received from the external electronic device 220 during the charging of the battery 420. When the position of the external electronic device 220 is out of the position of the charging circuitry 407, the processor 120 may provide a user interface for guiding the position of the charging circuitry 407.

According to an embodiment, the processor 120 may receive a fourth signal for indicating that the charging of the battery 420 is completed, from the external electronic device 220, and may terminate the charging operation.

According to an embodiment, the memory 130 may be operatively connected with the processor 120. The memory 130 may store instructions causing the processor 120 to perform the above-described operations of the electronic device 101.

Figure 5:
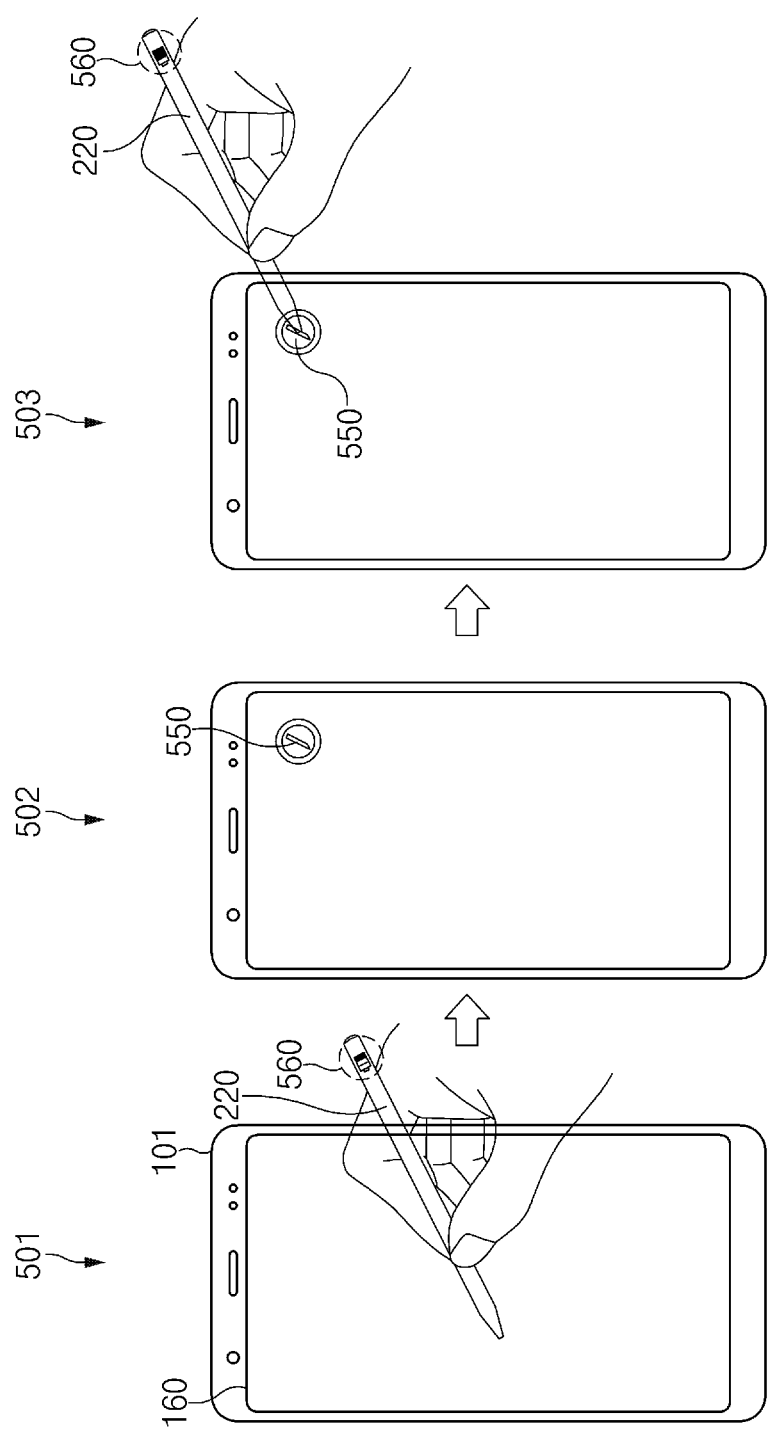
FIG. 5 is a view illustrating the operation of the electronic device to provide the user interface for charging the battery of the external electronic device, according to an embodiment.

FIG. 5 is a view illustrating the operation of the electronic device 101 to provide the user interface for charging the battery 420 of the external electronic device 220, according to an embodiment.

Referring to FIG. 5, in operation 501, the electronic device 101 may sense the input of the external electronic device 220 on the display 160. The input of the external electronic device 220 may include, for example, at least one of drawing input, button selection input, hovering input, or erasing input. The electronic device 101 may sense the input of the external electronic device 220 based on an electromagnetic induction signal. According to an embodiment, the electronic device 101 may receive the first signal for indicating the charging state of the battery 420 of the external electronic device 220. The first signal may be, for example, received via electromagnetic induction or may be wirelessly communicated to the electronic device 101 through the wireless communication circuitry 192 via a specified communication protocol. When the charging state of the battery 420 is less than a specified threshold value, the electronic device 101 may perform operation 502. According to an embodiment, the external electronic device 220 may display an indicator for indicating a charging state of the battery 420 on an area (e.g., reference number 560) of the external electronic device 220 to inform the user of the charging state of the battery 420.

In operation 502, the electronic device 101 may provide the user interface for enabling the charging of the battery 420. For example, the electronic device 101 may display a GUI 550 for enabling charging. The GUI 500 may be displayed on an area of the display 160 corresponding to where the charging circuitry (e.g., the charging circuitry 407 of FIG. 4) is positioned. As another example, although not illustrated in FIG. 5, the electronic device 101 may output a sound or a vibration through the sound output device 155 or the haptic module 179 to enable charging.

In operation 503, when the external electronic device 220 is positioned at the area where the GUI 550 is displayed, the electronic device 101 may perform the charging of the battery 420 by using the charging circuitry (not illustrated). According to an embodiment, the external electronic device 220 may display the charging state of the battery 420 on an area (e.g., reference number 560) of the external electronic device 220 during the charging of the battery 420.

Although FIG. 5 illustrates an embodiment of instructing the user to place the external electronic device 220 close to an area of the display 160 to enable charging, the charging circuitry (not illustrated) may be included in the recess formed in the side surface of the housing 210 or in the hole 221 into which the external electronic device 220 is inserted, according to an embodiment. In this embodiment, the electronic device 101 may provide the user interface for instructing the user to insert the external electronic device 220 into the recess or the hole 221.

According to an embodiment, not shown in FIG. 5, the electronic device 101 may provide another user interface (not illustrated) representing the charging state on the display 160 while the charging of the battery 420 is performed. For example, the processor 120 may receive information indicating the charging state of the battery 420 of the external electronic device 220 through the wireless communication circuitry 192 while the charging of the battery 420 is performed and may provide another user interface indicating the charging state of the battery on the display 160 based on the information.

Figure 6:
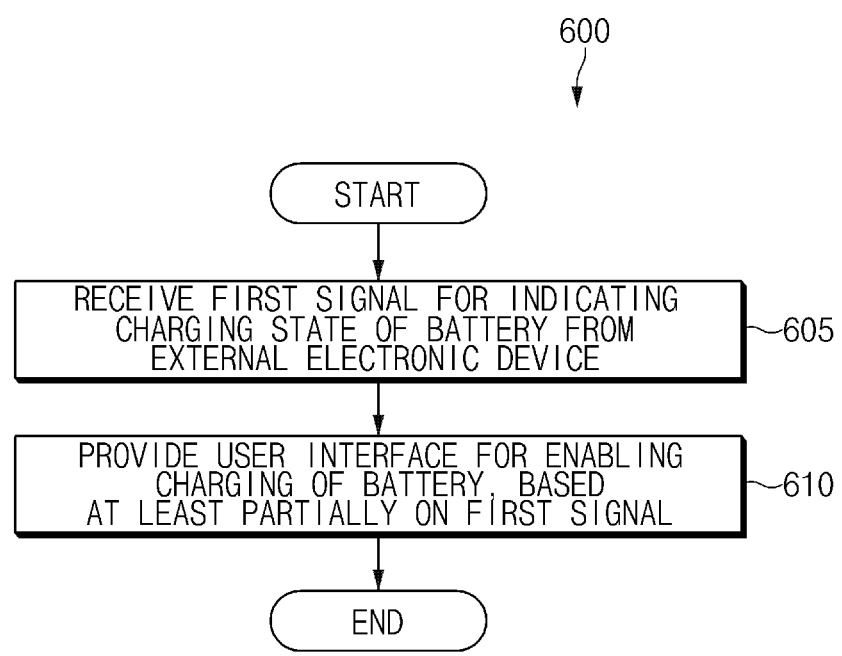
FIG. 6 is a flowchart illustrating operations of the electronic device to provide the user interface for charging the battery of the external electronic device, according to an embodiment.

FIG. 6 is a flowchart illustrating operations of the electronic device 101 to provide the user interface for charging the battery 420 of the external electronic device 220, according to an embodiment. The operations illustrated in FIG. 6 may be performed by the electronic device 101 or some components (e.g., the processor 120) of the electronic device 101.

Referring to FIG. 6, in operation 605 of method 600, the electronic device 101 may receive the first signal for indicating the charging state of the battery 420 from the external electronic device 220. The electronic device 101 may determine to charge the battery 420 based at least partially on the first signal. According to an embodiment, the first signal may include information representing a residual level of the battery 420 or information on requesting the electronic device 101 to charge the battery 420. According to an embodiment, the first signal may be transmitted through electromagnetic induction or may be wirelessly communicated to the electronic device 101 through a communication circuitry mounted on the external electronic device 220.

In operation 610, the electronic device 101 may provide a user interface for enabling the charging of the battery 420, based at least partially on the first signal. For example, the electronic device 101 may display the GUI 550 on the display 160 or may output sound or vibration.

Through the above-described method, charging of the battery 420 of the external electronic device 220 may be made convenient by allowing the user to use the electronic device 101 in real time while the battery 420 is charging.

Figure 7:
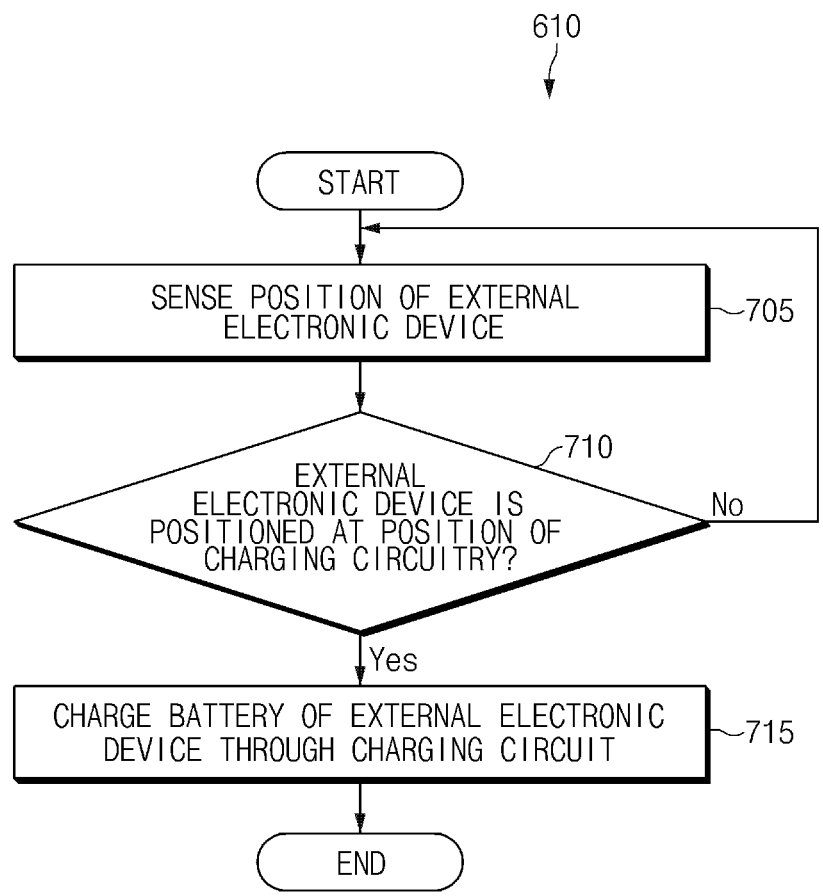
FIG. 7 illustrates the flowchart of operations of the electronic device for charging the battery of the external electronic device based on the position of the external electronic device, according to an embodiment.

FIG. 7 illustrates the flowchart of operations of the electronic device 101 for charging the battery 420 of the external electronic device 220 based on the position of the external electronic device 220, according to an embodiment. The operations illustrated in FIG. 7 may be performed after operation 610 of FIG. 6.

Referring to FIG. 7, after the user interface for enabling the charging of the battery 420 is provided on the display 160 of the electronic device 101, the electronic device 101 may sense the position of the external electronic device 220 in operation 705. According to an embodiment, the electronic device 101 may sense the position of the external electronic device 220 based at least partially on the signal of the external electronic device 220 received via electromagnetic induction.

In operation 710, the electronic device 101 may identify whether the external electronic device 220 is positioned at the position of the charging circuitry 407. The position of the charging circuitry 407 may be, for example, the area corresponding to the GUI 550 on the display 160. When the external electronic device 220 is not positioned at the position of the charging circuitry 407, the electronic device 101 may repeatedly perform operation 705 and operation 710.

When the external electronic device 220 is positioned at the position of the charging circuitry 407, the electronic device 101 may charge the battery 420 of the external electronic device 220 through the charging circuitry 407 in operation 715.

According to an embodiment, not shown in FIG. 7, the electronic device 101 may provide another user interface (not illustrated) representing the charging state on the display 160 while the charging of the battery 420 is performed in operation 715. For example, the electronic device 101 may receive information for indicating the charging state of the battery 420 of the external electronic device 220 through the wireless communication circuitry 192 while the charging of the battery 420 is performed and may provide another user interface indicating the charging state of the battery on the display 160 based on the received information.

Figure 8A:
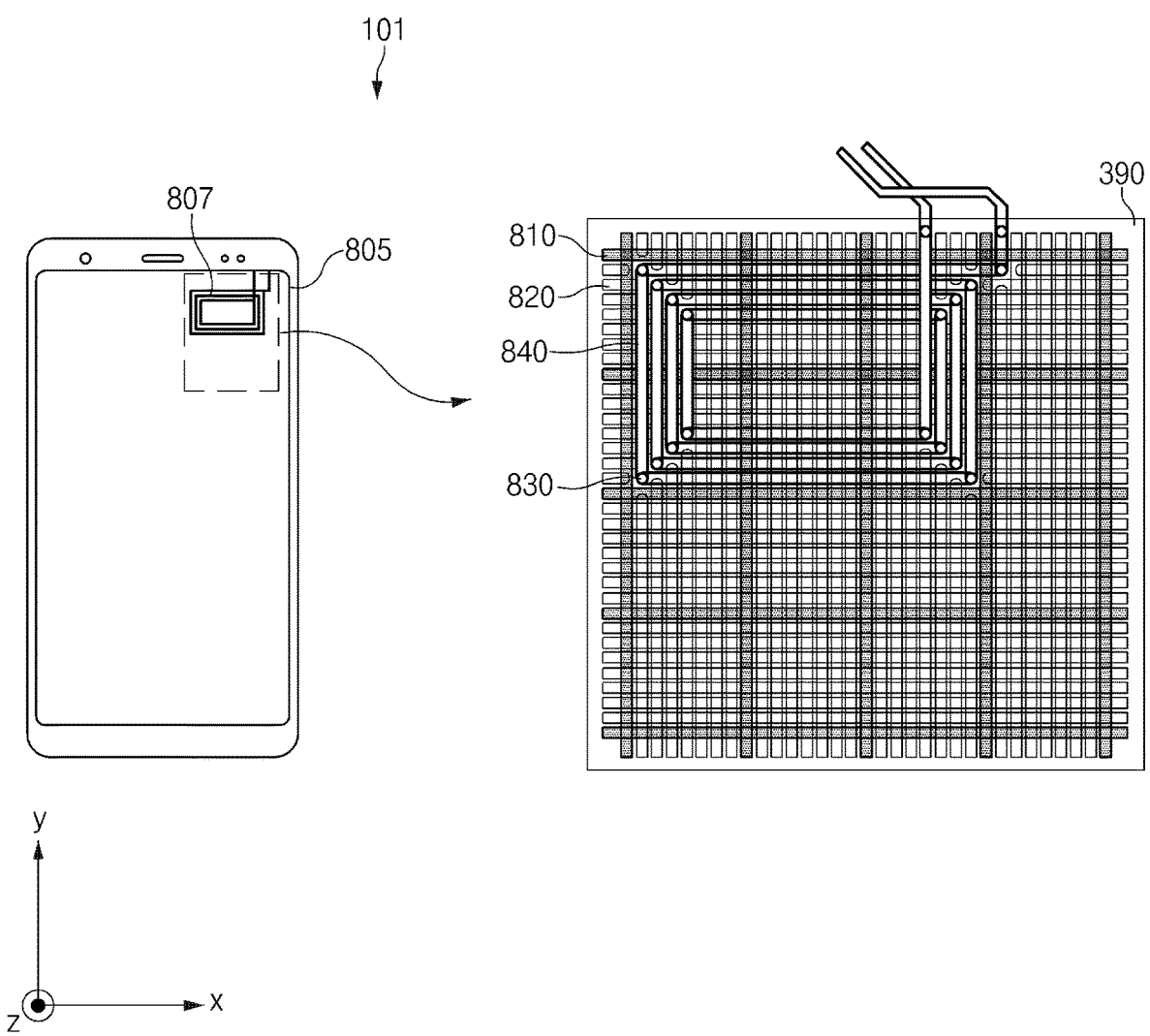
FIG. 8A illustrates the structure of the electromagnetic induction panel to charge the battery of the external electronic device, according to an embodiment.

FIG. 8A illustrates the structure of the electromagnetic induction panel 390 to charge the battery 420 of the external electronic device 220, according to an embodiment.

Figure 8B:
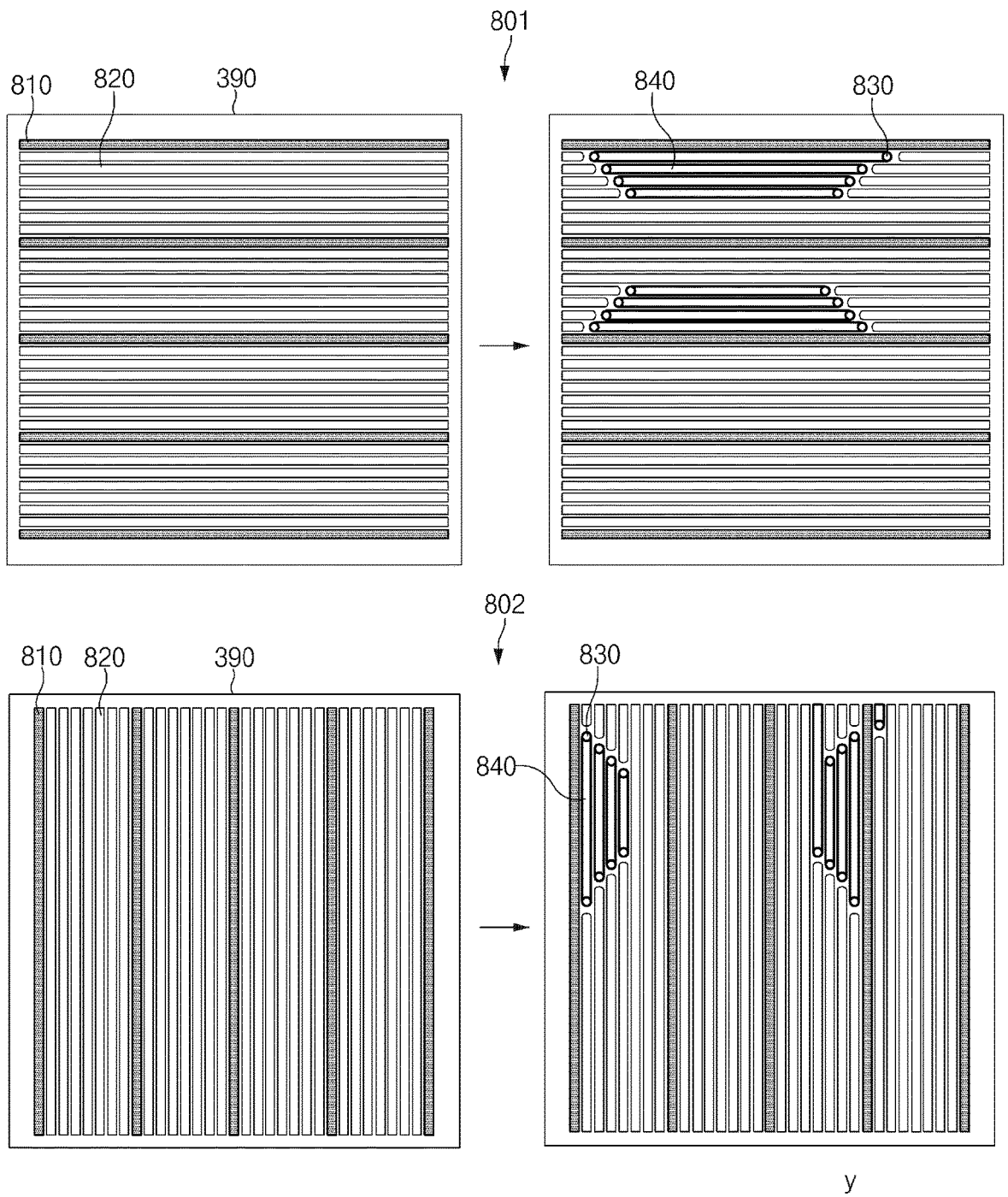
FIG. 8B are views illustrating a method for generating the structure of the electromagnetic induction panel for charging the battery of the external electronic device, according to an embodiment.
Figure 8C:
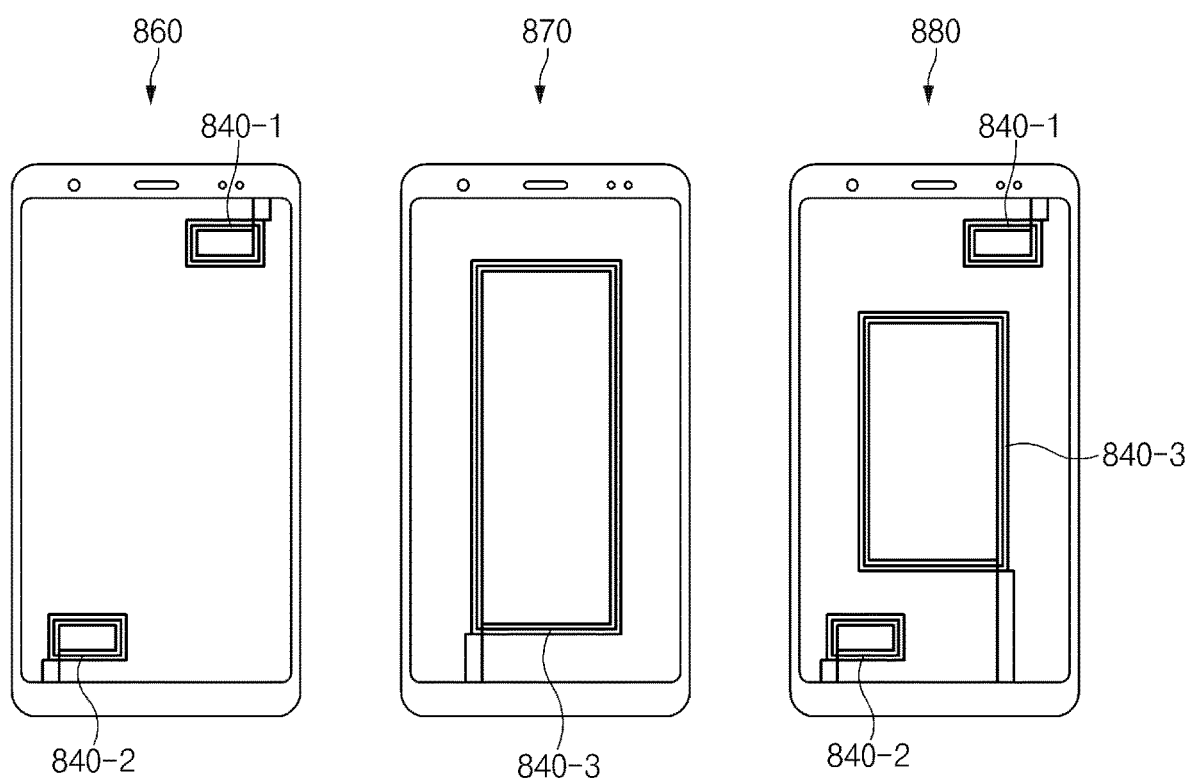
FIG. 8C is a view illustrating the structure of the conductive coil included in the electromagnetic induction panel, according to an embodiment.

Referring to FIG. 8A, the left side of the figure illustrates that a charging circuitry 807 (e.g., the charging circuitry 407 of FIG. 7) is disposed at a partial area (e.g., area 805) of the display 160 or the electromagnetic induction panel 390 (e.g., the digitizer) when the electronic device 101 is viewed from the front (in a +z axis). The right side of the figure illustrates an enlarged view of the area 805 of the electromagnetic induction panel 390. Although FIGS. 8A to 8C illustrate that the conductive coil 840 forming the charging circuitry 807 is visible from outside the housing 210, this is done only to explain the conductive coil 840. Generally, the conductive coil 840 is not visible from outside the housing 210.

Referring to the right side of FIG. 8A, the electromagnetic induction panel 390 may include a plurality of conductive lines 810 and 820. First conductive lines 810 may be electrically connected with the processor 120 and may transmit a signal used to receive the input of the external electronic device 220. Second conductive lines 820 may be interposed between the first conductive lines 810 to provide a uniform appearance for the electromagnetic induction panel 390. The second conductive lines 820 may not transmit any signals and thus may be referred to as dummy patterns.

According to an embodiment, some of the plurality of conductive lines 810 and 820 extend in a first direction (e.g., the x axis direction), and remaining lines of the plurality of conductive lines 810 and 820 may extend in a second direction (e.g., the y axis direction) perpendicular to the first direction. According to an embodiment, the conductive lines extending in the first direction and the conductive lines extending in the second direction may be disposed on separate surfaces of the electromagnetic induction panel 390. For example, the lines extending in the first direction may be disposed on the first surface (e.g., the front surface), and the lines extending in the second direction may be disposed on the second surface (e.g., the rear surface).

According to an embodiment, a portion of the second conductive lines 820 extending in the first direction and a portion of the second conductive lines 820 extending in the second direction are shorted, and the shorted partial areas are electrically connected with each other, thereby forming the conductive coil 840 to perform the function of the charging circuitry. For example, the shorted areas may be electrically connected with each other through a via 830.

Because the second conductive lines 820 are dummy patterns to which no current is applied when the electromagnetic induction panel 390 is used to detect inputs from the external pen, when they are used to form the conductive coil 840, the electronic device 101 may include a charging circuitry without adding another component. In addition, as the electronic device 101 independently uses the conductive coil 840 and the first conductive lines 810 in separate frequency channels, the charging efficiency may be increased, and the position of the external electronic device 220 may be identified during the charging of the battery 420.

FIG. 8B are views illustrating a method for generating the structure of the electromagnetic induction panel 390 for charging the battery 420 of the external electronic device 220, according to an embodiment.

Referring to FIG. 8B, reference number 801 illustrates the first conductive lines 810 and the second conductive lines 820 extending in the first direction. According to an embodiment, the conductive lines illustrated in reference number 801 may be disposed on the first surface (e.g., the front surface in the +z axis) of the electromagnetic induction panel 390. As shown in FIG. 8B, some of the second conductive lines 820 extending in the first direction may be shorted.

Reference number 802 illustrates the first conductive lines 810 and the second conductive lines 820 extending in the second direction. According to an embodiment, the lines illustrated in reference number 802 may be disposed on the second surface (e.g., the rear surface in the −z axis) parallel to the first surface. Some (e.g., reference number 840) of the second conductive lines 820 extending in the second direction may be shorted.

According to an embodiment, as shorted lines on the first surface are electrically connected with shorted lines on the second surface, the conductive coil 840 may be formed. For example, as the shorted lines are connected with each other through the via 830, the conductive coil 840 may be formed in the vertical direction (e.g., the z axis direction).

FIG. 8C is a view illustrating the structure of the conductive coil 840 included in the electromagnetic induction panel 390, according to an embodiment.

Referring to FIG. 8C, the conductive coil 840 forming the charging circuitry 807 may be disposed in a partial area of the electromagnetic induction panel 390. The electronic device 101 may guide the user to the position of the charging circuitry 807 based on the arrangement of the conductive coil 840. As the conductive coil 840 is disposed in a partial area of the electromagnetic induction panel 390, the electronic device 101 may efficiently supply electric power for charging the battery 420. For example, as illustrated with reference numeral 860, the electronic device 101 may include at least one conductive coil (e.g., at least one of a conductive coil 840-1 or a conductive coil 840-2) at partial areas (e.g., edge areas) of the electromagnetic induction panel 390. As another example, as illustrated with reference numeral 870, the electronic device 101 may include a conductive coil 840-3 at the center area of the electromagnetic induction panel 390. As another example, as illustrated with reference numeral 880, the electronic device 101 includes a plurality of conductive coils 840-1, 840-2, and 840-3 in the edge areas and the center area of the electromagnetic induction panel 390.

Figure 9A:
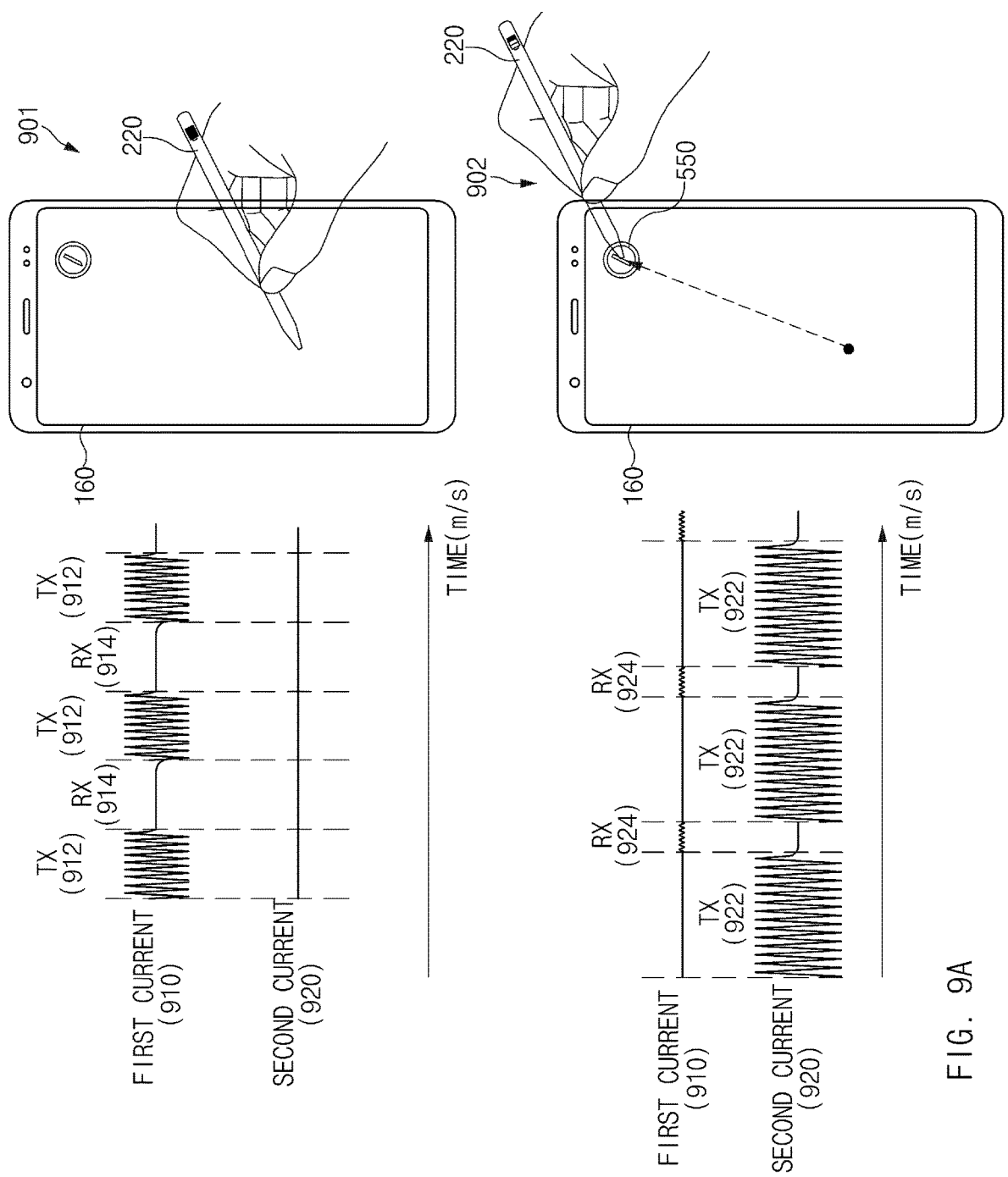
FIG. 9A are timing diagrams illustrating a first current applied to conductive lines and a second current applied to a charging circuit, according to an embodiment.

FIG. 9A are timing diagrams illustrating a first current 910, which is applied to the conductive lines 810, and a second current 920, which is applied to the charging circuitry 807, according to an embodiment.

Referring to FIG. 9A, operation 901 may represent the state of the electronic device 101 prior to the charging of the battery 420. In this state, the external electronic device 220 may be tracked by the electronic device 101. Operation 902 may represent the state of the electronic device 101 when the electronic device 101 is charging the battery 420. The first current 910 may refer to a current applied to the plurality of conductive lines (e.g., 810) of FIG. 8A to receive the input of the external electronic device 220. The second current 920 may refer to a current applied to the charging circuitry 807 including the conductive coil 840.

In operation 901, the electronic device 101 may transmit a signal through the conductive lines 810 for a first transmission (TX) duration 912 to receive the input of the external electronic device 220 via electromagnetic induction and may receive an induced signal from the external electronic device 220 through the conductive lines 810 during the first reception (RX) duration 914. According to an embodiment, in operation 901, the electronic device 101 is not applying a current to the charging circuitry 807 because the electronic device 101 is not charging the battery 420.

In operation 902, when the external electronic device 220 is positioned at the position of the charging circuitry 807 (e.g., the position marked by the GUI 550), the electronic device 101 may charge the battery 420 by applying a current to the charging circuitry 807 for a second TX duration 922. According to an embodiment, the length of the second TX duration 922 may be equal to or greater than the length of the first TX duration 912. According to an embodiment, the electronic device 101 may receive the induced signal from the external electronic device 220 through the conductive lines 810 during the second RX duration 924 when the current is not applied to the charging circuitry 807. This induced signal may be detected to locate the position of the external electronic device 220 during the charging of the battery 420.

Figure 9B:
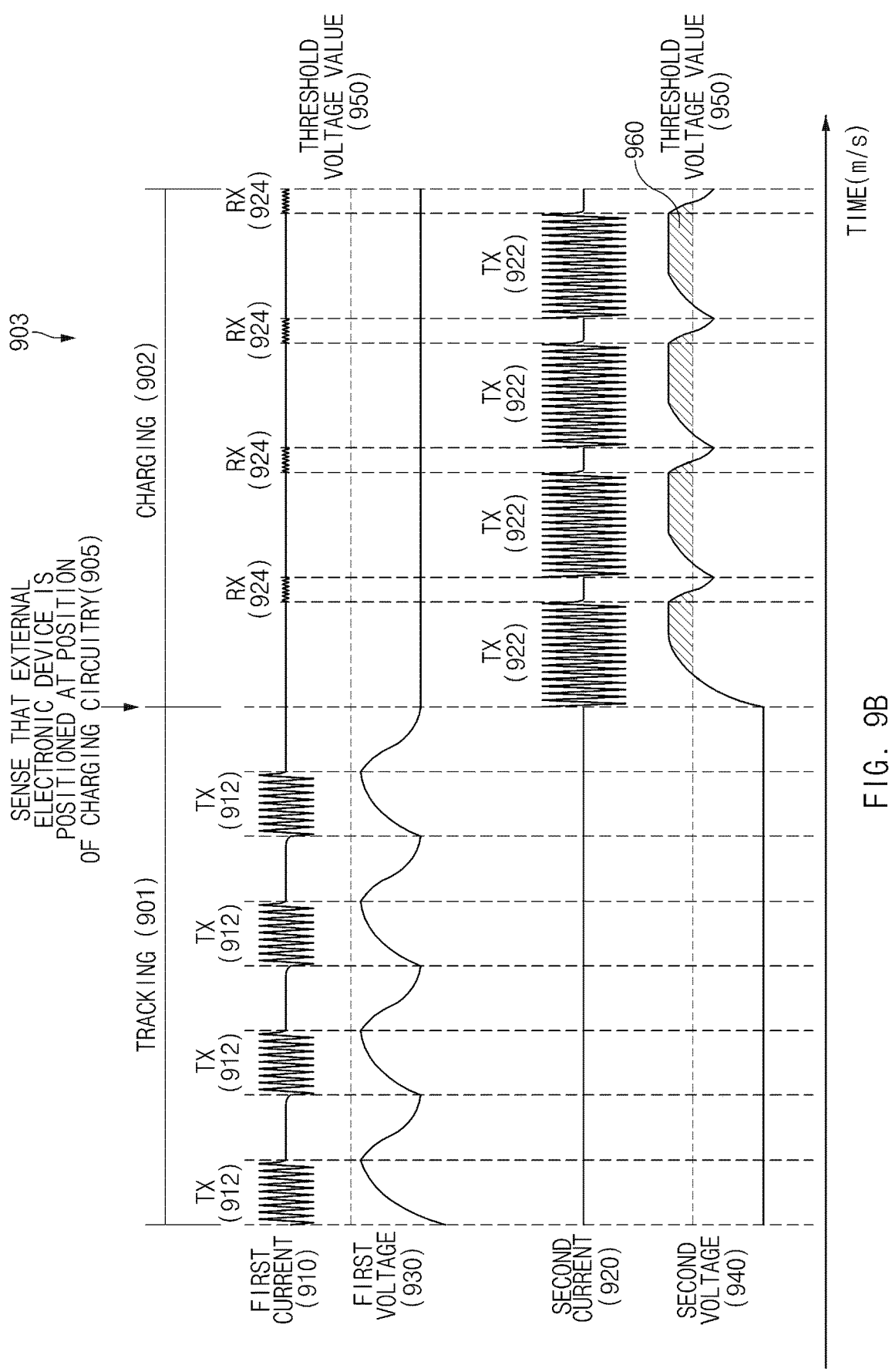
FIG. 9B is a timing diagram illustrating the variation of a first voltage induced in the resonance circuitry of the external electronic device by the conductive lines over time and the variation of the second voltage induced in the resonance circuitry of the external electronic device by the charging circuit over time, according to an embodiment.

FIG. 9B is a timing diagram illustrating the variation of a first voltage 930 induced in the resonance circuitry 410 of the external electronic device 220 by the conductive lines 810 and the variation of a second voltage 940 induced in the resonance circuitry 410 of the external electronic device 220 by the charging circuitry, according to an embodiment.

According to an embodiment, when the second voltage 940 induced in the resonance circuitry 410 of the external electronic device 220 by the charging circuitry 807 is equal to or greater than a threshold voltage value 950, the charging circuitry (not illustrated) connected with the battery 420 of the external electronic device 220 is electrically connected with the resonance circuitry 410, so the signal may be transmitted to the battery 420 to charge the battery 420.

Referring to graph 903 of FIG. 9B, the first voltage 930 induced in the resonance circuitry 410 by the conductive lines during the tracking operation 901 does not exceed the threshold voltage value 950, the battery 420 may not be charged. According to an embodiment, the electronic device 101 may perform operation 902 in response to the external electronic device 220 being positioned at the position of the charging circuitry 807.

According to an embodiment, in operation 902 when charging is performed, the electronic device 101 may transmit a signal through the charging circuitry 807 during the second TX duration 922. The voltage (e.g., the second voltage 940) induced in the resonance circuitry 410 from the charging circuitry 807 exceeds the threshold voltage value 950, so the battery 420 may be charged by the voltage (e.g., reference number 960) exceeding the threshold voltage value 950.

Figure 10:
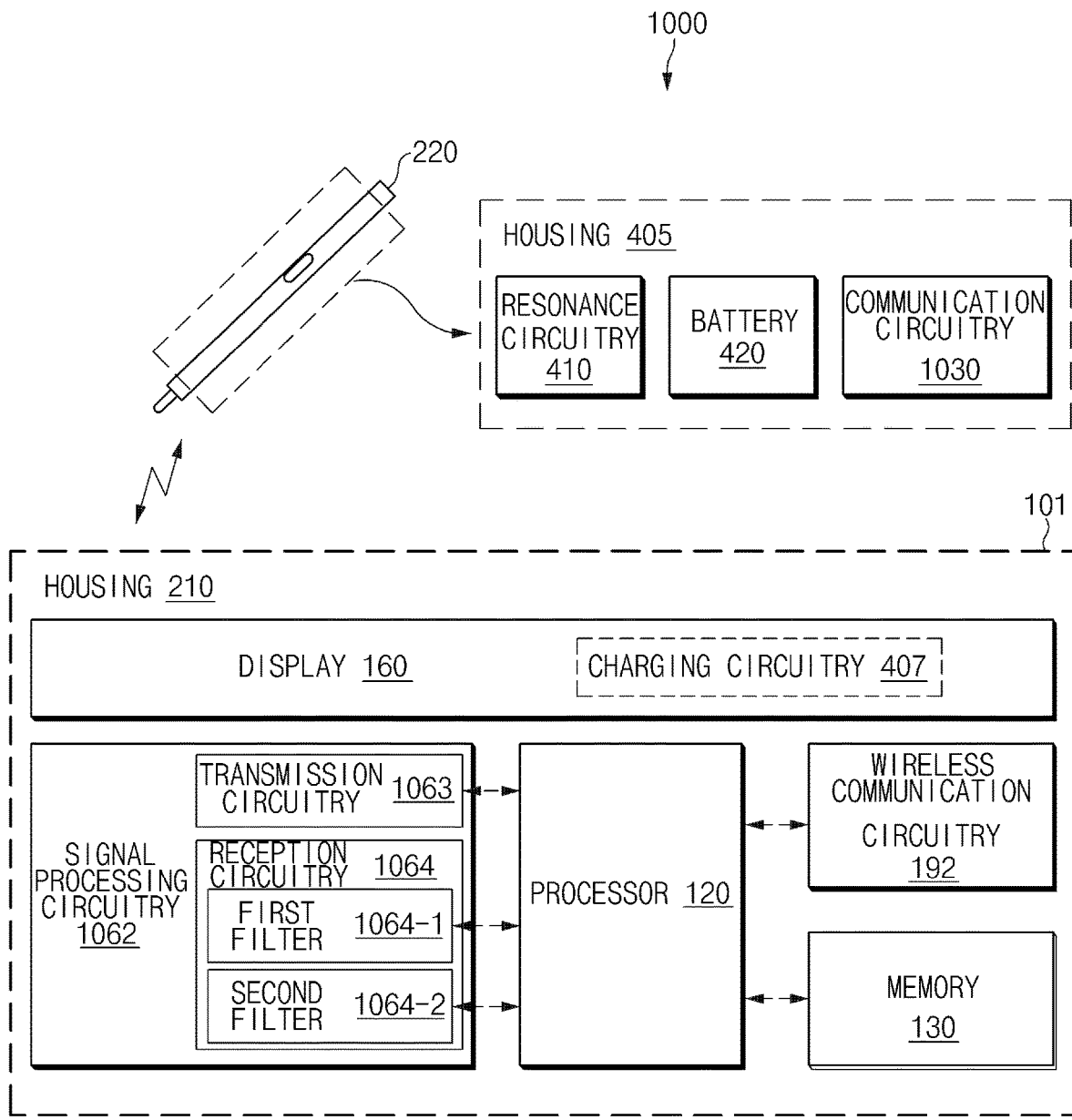
FIG. 10 illustrates a block diagram of the electronic device including a signal processing circuitry, according to an embodiment.

FIG. 10 illustrates a block diagram of the electronic device 101 including a signal processing circuitry 1062, according to an embodiment. FIG. 10 is a block diagram illustrating that at least one component is further included in the electronic device 101 and the external electronic device 220 of FIG. 4.

Referring to FIG. 10, the electronic device 101 may include the signal processing circuitry 1062 configured to process signals received from the external electronic device 220 via electromagnetic induction. The signal processing circuitry 1062 may include a transmission circuitry 1063 and a reception circuitry 1064. According to an embodiment, the signal processing circuitry 1062 may include at least one other component (e.g., a channel selector or switch) to process signals in addition to the components illustrated in FIG. 10.

According to an embodiment, the transmission circuitry 1063 may process signals transmitted to the external electronic device 220. The external electronic device 220 may generate signals having a specified resonance frequency based on the signal received from the transmission circuitry 1063.

According to an embodiment, the reception circuitry 1064 may process signals received from the external electronic device 220. The reception circuitry 1064 includes a first filter 1064-1 configured to process the signals received during the tracking operation 901 and a second filter 1064-2 configured to process the signal received during the charging operation 902. According to an embodiment, when the second voltage 940 is greater than or equal to the threshold voltage value 950 so that the battery 420 is charged, the charging circuitry (not illustrated) connected with the battery 420 of the external electronic device 220 may be connected with the resonance circuitry 410, so the resonance frequency of the signal may be changed. The electronic device 101 may identify the position of the external electronic device 220 based on the signal received during the charging operation 902 (e.g., during the second RX duration 924) by processing the signal having the changed resonance frequency received through the second filter 1064-2.

According to an embodiment, the external electronic device 220 may include a communication circuitry 1030 configured to perform wireless communication with the wireless communication circuitry 192 of the electronic device 101. According to an embodiment, the communication circuitry 1030 may perform BLE wireless communication. According to an embodiment, the communication circuitry 1030 may transmit a signal used to initiate or stop charging of the battery 420. For example, the communication circuitry 1030 may transmit the first signal for indicating the charging state of the battery 420. As another example, the communication circuitry 1030 may transmit the fourth signal for indicating that the charging of the battery 420 is completed.

Figure 11:
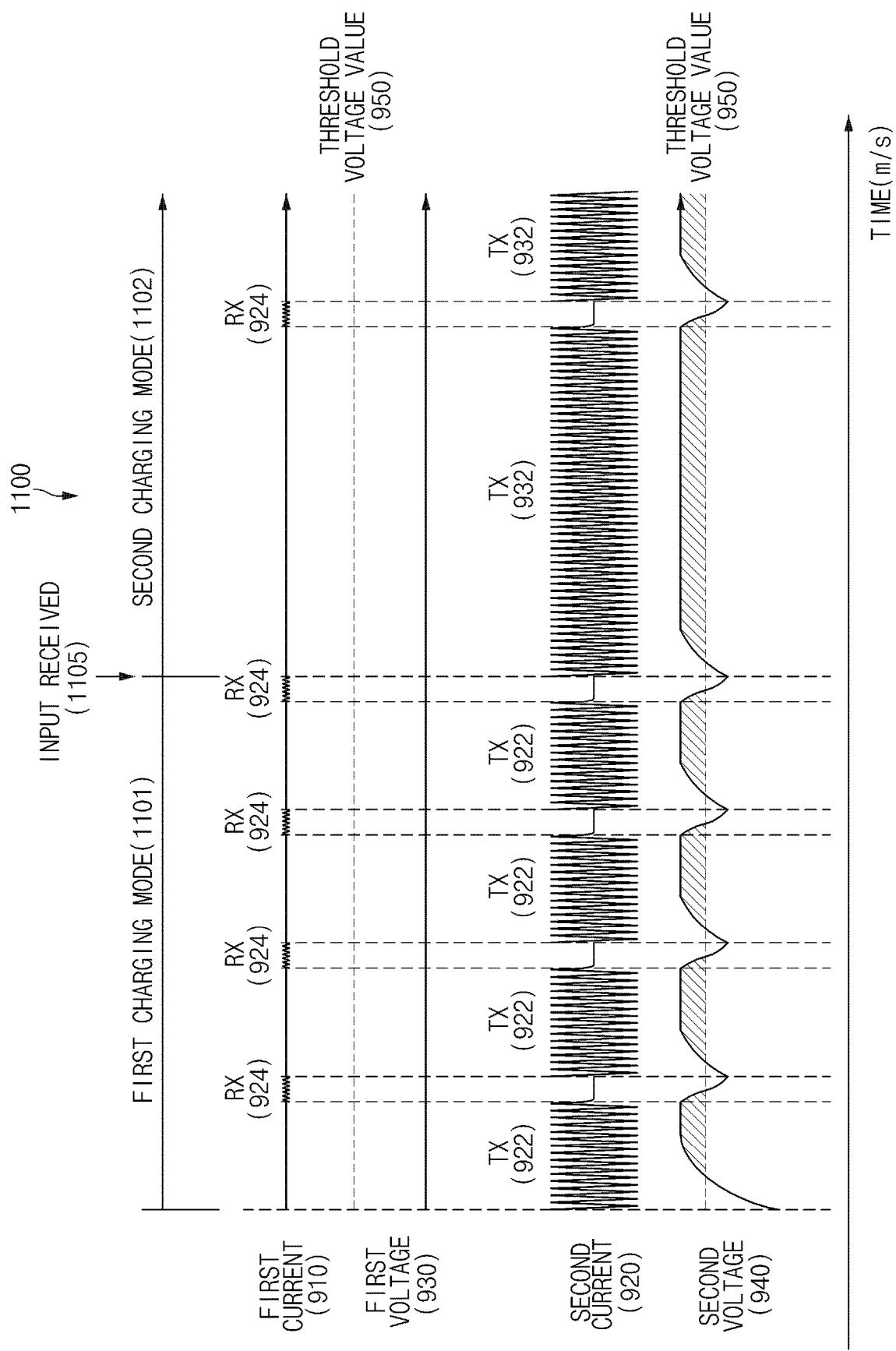
FIG. 11 is a timing diagram illustrating change of charging modes of the electronic device, according to an embodiment.

FIG. 11 is a timing diagram illustrating change of charging modes 1101 and 1102 of the electronic device 101, according to an embodiment.

Referring to graph 1100 of FIG. 11, the electronic device 101 may change a charging mode from a first charging mode 1101 to a second charging mode 1102 or from the second charging mode 1102 to the first charging mode 1101 based at least partially on an input 1105 received from the external electronic device 220. The input 1105 received from the external electronic device 220 may be, for example, a button input.

According to an embodiment, the first charging mode 1101 may refer to a charging mode to charge the battery 420 for the first duration (e.g., the second TX duration 922) separated by the first time interval (e.g., the second RX duration 924). The second charging mode 1102 may refer to a charging mode to charge the battery 420 for the second duration (e.g., the third TX duration 932) longer than the first duration. During the second charging mode 1102, although the electronic device 101 may reduce the time necessary to fully charge the battery 420, power consumption of the electronic device 101 may increase. Through the above-described method, the electronic device 101 may allow the user to select the charging mode depending on his or her desired charging speed of the battery 420 and the desired power consumption of the electronic device 101.

According to an embodiment, the electronic device 101 may identify the position, pressure, or input form of the external electronic device 220 for the second RX duration 924 in which the battery 420 is not charged in the second charging mode 1102.

Although FIG. 11 illustrates an embodiment that the electronic device 101 changes the charging mode based on an input received from the external electronic device 220, the electronic device 10 may determine the charging mode based on the residual level of the battery 420, so that the charging mode is not dependent on the input from the external electronic device 220. For example, when the residual level of the battery 420 is less than a specified threshold value, the electronic device 101 may select the second charging mode 1102 to reduce the charging time of the battery 420. When the residual level of the battery 420 is equal to or greater than the specified threshold value, the electronic device 101 may select the first charging mode 1101.

Figure 12:
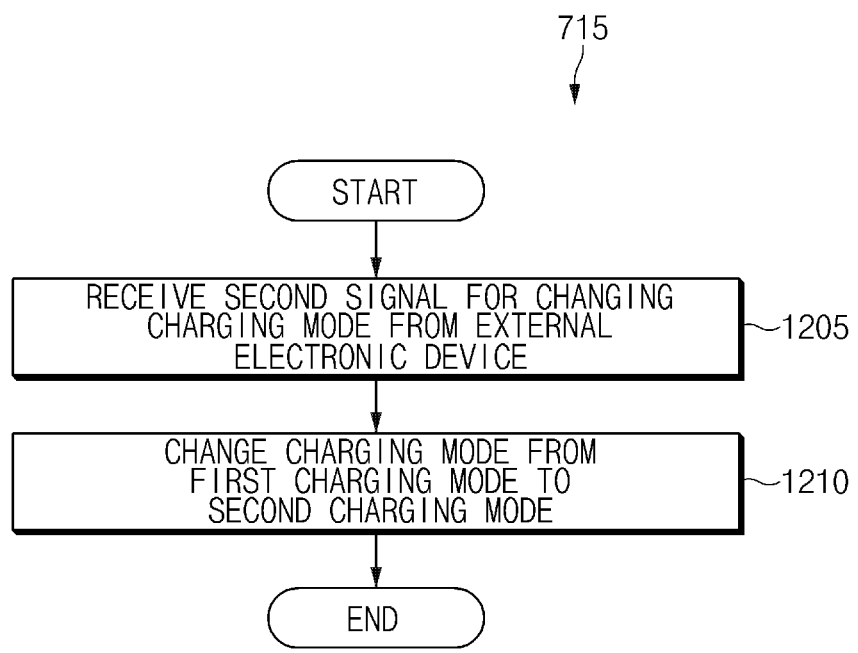
FIG. 12 is a flowchart illustrating the operation of the electronic device to change charging modes and during the charging operation, according to an embodiment.

FIG. 12 is a flowchart illustrating the operation of the electronic device 101 to change charging modes 1101 and 1102 during the charging operation, according to an embodiment. The operations illustrated in FIG. 12 may be performed after operation 715 of FIG. 7.

Referring to FIG. 12, in operation 1205, the electronic device 101 may receive the second signal for changing the charging mode from the external electronic device 220. For example, the electronic device 101 may receive the second signal generated by a button input.

In operation 1210, the electronic device 101 may change the charging mode from the first charging mode 1101 to the second charging mode 1102. Conversely, although not illustrated in FIG. 12, when the second signal is received in the second charging mode 1102, the electronic device 101 may change the charging mode from the second charging mode 1102 to the first charging mode 1101.

Figure 13:
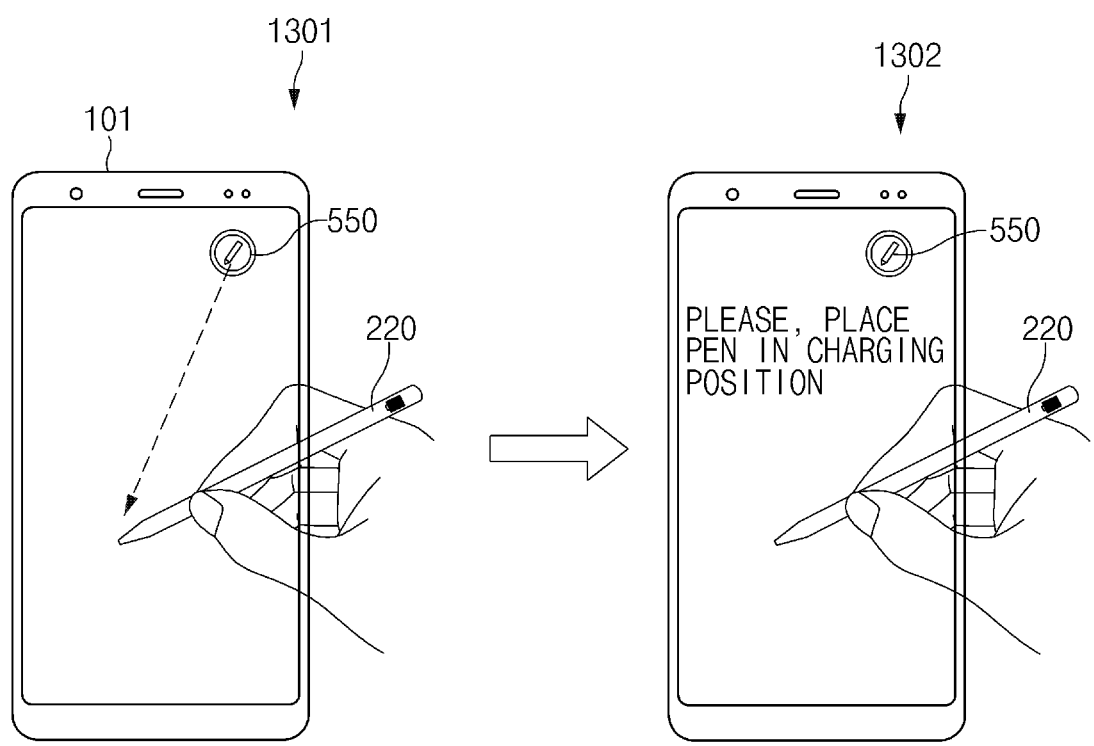
FIG. 13 is a view illustrating the operation of the electronic device when the external electronic device deviates from the position of the charging circuitry during the charging operation, according to an embodiment.

FIG. 13 is a view illustrating the operation of the electronic device 101 when the external electronic device 220 is out of the position of the charging circuitry during the charging operation, according to an embodiment.

Referring to FIG. 13, as illustrated in operation 1301, the electronic device 101 may detect whether the external electronic device 220 is out of the position of the charging circuitry (e.g., the position indicated by the GUI 550) during the charging operation. According to an embodiment, the electronic device 101 may detect that the external electronic device 220 is out of the position of the charging circuitry based on at least a portion of the signal received during the second RX duration 924.

In operation 1302, the electronic device 101 may provide a user interface for guiding the position of the external electronic device 220 back to the position of the charging circuitry. For example, the electronic device 101 may display, on the display 160, text (e.g., "Please, place the pen in the charging position") for guiding the position of the external electronic device 220. As another example, the electronic device 101 may provide the effect so that the GUI 550 displayed on the display 160 is blinking or varied in color. As still another example, the electronic device 101 may output sound or vibration for guiding the position of the external electronic device 220.

Figure 14:
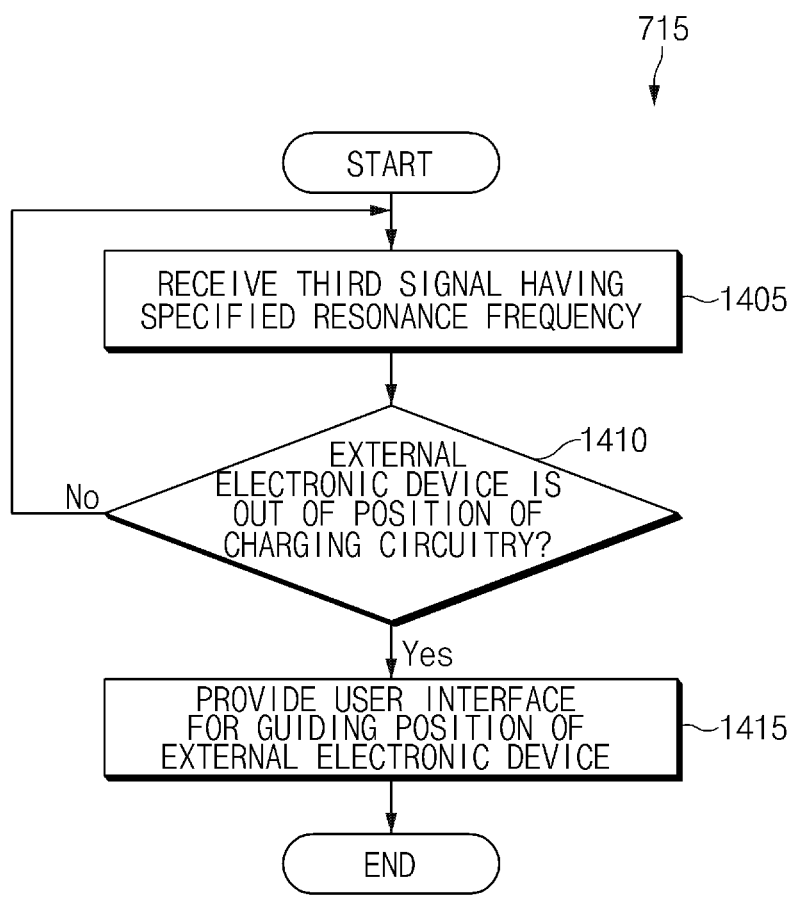
FIG. 14 is a flowchart illustrating the operations of the electronic device when the external electronic device is out of the position of the charging circuitry during the charging operation, according to an embodiment.

FIG. 14 is a flowchart illustrating the operations of the electronic device 101 when the external electronic device 220 is out of the position of the charging circuitry during the charging operation, according to an embodiment. The operations illustrated in FIG. 14 may be performed after operation 715 of FIG. 7.

Referring to FIG. 14, in operation 1405, the electronic device 101 may receive the third signal having the specified resonance frequency from the external electronic device 220 during the charging operation 902. The third signal may be, for example, a signal generated from the external electronic device 220 via electromagnetic induction. The electronic device 101 may process the third signal through the second filter 1064-2 and may identify the position of the external electronic device 220 based on the processed signal.

In operation 1410, the electronic device 101 may identify whether the external electronic device 220 is out of the position of the charging position (e.g., the position indicated by the GUI 550). When the external electronic device 220 is not out of the position of the charging circuitry, the electronic device 101 may repeat operation 1405 and operation 1410. When the external electronic device 220 is out of the position of the charging circuitry, the electronic device 101 may perform operation 1415.

In operation 1415, the electronic device 101 may provide the user interface for guiding the position of the external electronic device 220 back to the position of the charging circuitry. According to an embodiment, the electronic device 101 may apply an effect on the GUI 550 displayed on the display 160, may add new text (e.g., "Please, place the pen at the charging position") or may output sound or vibration.

Figure 15:
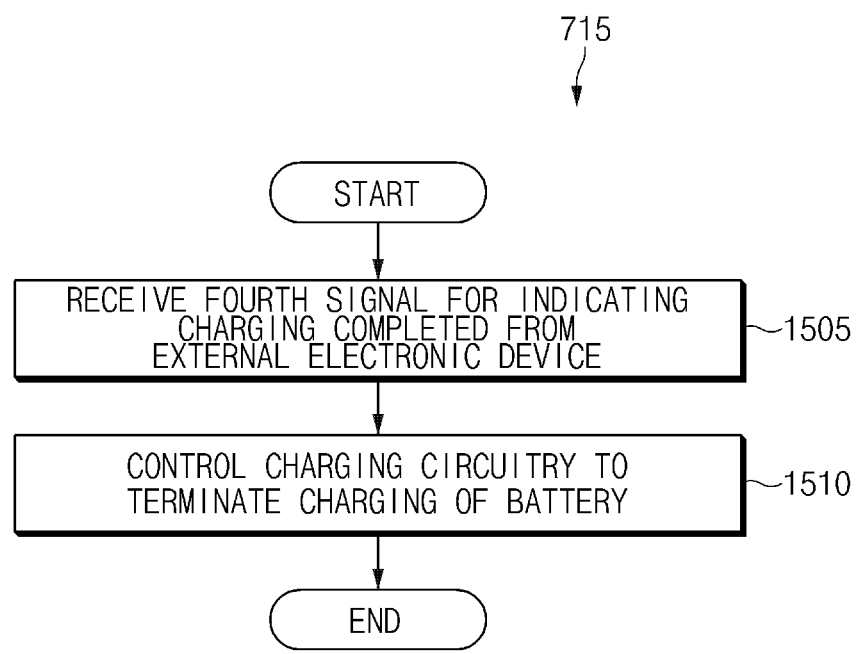
FIG. 15 is a flowchart illustrating the operations of the electronic device of terminating the charging of the battery, according to an embodiment.

FIG. 15 is a flowchart illustrating the operations of the electronic device 101 of terminating the charging of the battery 420, according to an embodiment. The operations illustrated in FIG. 15 may be performed after operation 715 of FIG. 7.

Referring to FIG. 15, in operation 1505, the electronic device 101 may receive the fourth signal for indicating that the charging is completed, from the external electronic device 220. According to an embodiment, the fourth signal may be received from the communication circuitry 1030 of the external electronic device 220 based on the BLE protocol. According to another embodiment, the fourth signal may be received as an input from the external electronic device 220. According to an embodiment, the fourth signal may include information at least partially the same as the first signal for indicating the charging state of the battery 420. When the electronic device 101 receives the fourth signal from the external electronic device 220, the electronic device 101 may perform operation 1510.

In operation 1510, the electronic device 101 may control the charging circuitry 807 to terminate the charging operation of the battery 420. For example, referring to FIG. 9B, the electronic device 101 may change from the charging operation 902 to the tracking operation 901.

As described above, an electronic device (e.g., the electronic device 101 of FIG. 1) may include a housing (e.g., the housing 210 of FIG. 4), a touchscreen display (e.g., the display 160 of FIG. 4) viewable through a portion of the housing, a wireless communication circuitry (e.g., the wireless communication circuitry 192 of FIG. 4) disposed inside the housing, a processor (e.g., the processor 120 of FIG. 4) disposed inside the housing and operatively connected to the touchscreen display and the wireless communication circuitry, and a memory (e.g., the memory of FIG. 4) operatively connected to the processor. The memory may store instructions that, when executed, cause the processor to receive a first signal indicating a charging state of a battery, from an external electronic device (e.g., the external electronic device 220 of FIG. 4) including the battery (e.g., the battery 420 of FIG. 4) through the wireless communication circuitry, and to provide a user interface corresponding to charging of the battery, based at least partially on the first signal.

According to an embodiment, the electronic device may further include a charging circuitry (e.g., the charging circuitry 407 of FIG. 4) included in the touchscreen display or disposed adjacent to the touchscreen display. The user interface includes a graphic user interface (GUI) (e.g., the GUI 550 of FIG. 5) representing a position of the charging circuitry.

According to an embodiment, the housing may further include a speaker, and the instructions may cause the processor to provide the user interface by using the speaker.

According to an embodiment, the external electronic device may be a stylus pen.

According to an embodiment, the housing further may include a recess longitudinally extending along a side of the housing, and the stylus pen may be detachably inserted into the recess.

According to an embodiment, the instructions may cause the processor to provide another user interface guiding a user to insert the stylus pen into the recess.

According to an embodiment, the wireless communication circuitry is configured to support a Bluetooth standard.

According to an embodiment, the instructions may cause the process to display the GUI on an area of the touchscreen display.

As described above, a method of an electronic device (e.g., the electronic device 101 of FIG. 1) may include receiving a first signal indicating a charging state of a battery from an external electronic device (e.g., the external electronic device 220 of FIG. 4) including the battery, and providing a user interface corresponding to charging of the battery, based at least partially on the first signal.

According to an embodiment, the electronic device may include a speaker, and the providing of the user interface includes displaying a GUI representing a position of a charging circuitry on the display of the electronic device, or outputting a sound indicating the position of the charging circuitry through the speaker.

According to an embodiment, the method may further include detecting that the external electronic device is positioned at a position of a charging circuitry, and detecting that the external electronic device is inserted into a hole included in a housing of the electronic device.

According to an embodiment, the method may further include receiving a second signal indicating a change of a charging mode of the battery from the external electronic device during the charging of the battery, and controlling the charging circuitry to increase a charging speed of the battery based at least partially on the second signal.

According to an embodiment, the method may further include receiving a third signal having a specified resonance frequency from the external electronic device during the charging of the battery, identifying a position of the external electronic device, based at least partially on the third signal, and providing another user interface guiding the position of the external electronic device when the position of the external electronic device is misaligned with a position of a charging circuitry.

According to an embodiment, the providing of the user interface guiding the position of the external electronic device includes outputting a GUI, a sound, or a vibration to guide the position of the external electronic device.

According to an embodiment, the method may further include receiving a fourth signal indicating that the charging of the battery is completed, from the external electronic device, and controlling a charging circuitry to terminate the charging of the battery based at least partially on the fourth signal.

As described above, an electronic device (e.g., the electronic device 101 of FIG. 1) may include a housing (e.g., the housing 210 of FIG. 2) including a first plate (e.g., the front plate 202 of FIG. 2) and a second plate (e.g., the rear plate 211 of FIG. 2) facing in a direction opposite to a direction of the first plate, a touchscreen display (e.g., the display 160 of FIG. 2) panel viewable through at least a portion of the first plate, a wireless communication circuitry (e.g., the wireless communication circuitry 192 of FIG. 4) disposed inside the housing, a conductive coil (e.g., the conductive coil 840 of FIG. 8) included in the touchscreen display panel or disposed adjacent to the touchscreen display panel, and configured to generate an electromagnetic wave transmitted through the first plate, at least one processor operatively connected to the touchscreen display panel, the wireless communication circuitry, and the conductive coil, and a memory (e.g., the memory 130 of FIG. 4) operatively connected to the processor. The memory may store instructions that, when executed, cause the processor to receive a first signal indicating a charging state of a battery from a stylus pen (e.g., the external electronic device 220 of FIG. 4) including the battery through the wireless communication circuitry, to provide a user interface corresponding to charging of the battery, based at least partially on the first signal, and to apply a current to the conductive coil, in response to detecting that the stylus pen is located at a position corresponding to the conductive coil.

According to an embodiment, the touchscreen display panel may further include an electromagnetic induction panel (e.g., the electromagnetic induction panel 390 of FIG. 3) structure to detect the stylus pen, and the conductive coil may be included inside the electromagnetic induction panel structure.

According to an embodiment, the electromagnetic induction panel structure may include a plurality of first conductive lines (e.g., the first conductive line 810 of FIG. 8A) extending in a first direction on a first plane parallel to the first plate, and a plurality of second conductive lines (e.g., the second conductive line 820 of FIG. 8A) extending in a second direction perpendicular to the first direction, on a second plane spaced apart from the first plane while being parallel to the first plane. The conductive coil may include first parts of the plurality of first conductive lines, second parts of the plurality of second conductive lines, and conductive vias for connecting the first parts with the second parts.

According to an embodiment, the housing may further include a recess longitudinally extending along a side of the housing, the stylus pen may be detachably inserted into the recess, and, the instructions may cause the processor to provide another user interface guiding a user to insert the stylus pen into the recess.

According to an embodiment, the electronic device may further include a signal processing circuitry configured to process signals transmitted to the stylus pen or signals received from the stylus pen. The instructions may cause the processor to transmit a first signal having a first frequency through the signal processing circuitry, to receive a second signal having a second frequency different from the first frequency from the stylus pen, and to identify a position of the stylus pen by processing the second signal having the second frequency using the signal processing circuitry.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As described above, according to one or more embodiments disclosed in the disclosure, the electronic device may charge the battery of the external electronic device without requiring an additional charging device to be mounted in the electronic device. This may be done by charging the battery using the conductive coil included in at least a portion of the electromagnetic induction panel.

According to one or more embodiments disclosed in the disclosure, the electronic device may provide a user interface allowing the user to charge the battery of the external electronic device during the use of the external electronic device, thereby providing convenience to the user.

Besides, a variety of effects directly or indirectly understood through the disclosure may be provided.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A portable communication device comprising:
a housing;
a touchscreen display viewable through a portion of the housing and including an electromagnetic induction panel structure configured to detect a stylus pen;
a wireless communication circuitry disposed inside the housing;
a charging circuitry disposed inside the housing such that, among a plurality of edges of the touchscreen display, one edge is most adjacent to the charging circuitry, wherein the charging circuitry comprises a conductive coil;
a processor disposed inside the housing and operatively connected to the touchscreen display, the charging circuitry, and the wireless communication circuitry; and
a memory operatively connected to the processor,
wherein the memory stores instructions that, when executed, cause the processor to:
receive a first signal indicating a charging state of a battery, from the stylus pen including the battery through the wireless communication circuitry;
provide a first user interface regarding charging of the battery of the stylus pen, based at least partially on the first signal;
detect that the stylus pen is positioned at a position of the conductive coil;
charge, through the charging circuitry, the battery of the stylus pen in response to detecting that the stylus pen is positioned at the position of the conductive coil; and
provide a second user interface representing the charging of the battery of the stylus pen while the battery is being charged,
wherein the first user interface and/or the second user interface are provided adjacent to the one edge to indicate to the user the position of the charging circuitry,
wherein the electromagnetic induction panel structure includes:
a first plurality of first conductive lines extending in a first direction on a first plane, the first conductive lines configured to be used to detect the stylus pen;
a second plurality of first conductive lines extending in a second direction perpendicular to the first direction, on a second plane spaced apart from the first plane while being parallel to the first plane;
a first plurality of second conductive lines extending in the first direction on the first plane interposed between the first plurality of first conductive lines, the second conductive lines configured to be a dummy pattern used to provide a uniform appearance for the electromagnetic induction panel structure; and
a second plurality of second conductive lines extending in the second direction on the second plane interposed between the second plurality of first conductive lines, and
wherein the conductive coil is implemented by a first shorted portion of the first plurality of second conductive lines, a second shorted portion of the second plurality of second conductive lines, and conductive vias connecting the first shorted portion and the second shorted portion.

2. The portable communication device of claim 1, wherein the charging circuitry is included in the touchscreen display or disposed adjacent to the touchscreen display, and
wherein the instructions further cause the processor to charge the battery of the stylus pen through the conductive coil and a conductive coil of the stylus pen.

3. The portable communication device of claim 1, wherein the stylus pen supports at least one of electromagnetic resonance (EMR), active electrical stylus (AES), or electric coupled resonance (ECR).

4. The portable communication device of claim 1, wherein the wireless communication circuitry is configured to support a Bluetooth standard.

5. The portable communication device of claim 1, wherein the instructions further cause the processor to:
receive a second signal from the stylus pen; and
in response to receiving the second signal, change a charging mode from a first charging mode to a second charging mode by increase an amount of a current provided to the charging circuitry.

6. The portable communication device of claim 1, wherein the instructions further cause the processor to:
receive, from the stylus pen, a third signal having a specified resonance frequency while the charging of the battery is performed;
identify, based on the third signal, that the stylus pen is out of the position of the conductive coil; and
provide a third user interface guiding a position of the stylus pen to coincide with the position of the conductive coil.

7. The portable communication device of claim 1, wherein the instructions further cause the processor to:
receive a fourth signal from the stylus pen while the charging of the battery is performed; and
in response to receiving the fourth signal, control the charging circuitry to terminate the charging.

8. A method of a portable communication device including a touchscreen display that includes an electromagnetic induction panel structure configured to detect a stylus pen, the method comprising:
receiving a first signal indicating a charging state of a battery from the stylus pen including the battery;
providing a first user interface regarding charging of the battery of the stylus pen, based at least partially on the first signal;
detecting that the stylus pen is positioned at a position of a conductive coil of the portable communication device;

charging, through a charging circuitry, the battery of the stylus pen in response to detecting that the stylus pen is positioned at the position of the conductive coil; and providing a second user interface representing the charging of the battery of the stylus pen while the battery is being charged, wherein the charging circuitry is disposed in the portable communication device such that, among a plurality of edges of the touchscreen display, one edge is most adjacent to the charging circuitry, wherein the first user interface and/or the second user interface are provided adjacent to the one edge to indicate to the user the position of the conductive coil, wherein the electromagnetic induction panel structure includes:
 a first plurality of first conductive lines extending in a first direction on a first plane, the first conductive lines configured to be used to detect the stylus pen;
 a second plurality of first conductive lines extending in a second direction perpendicular to the first direction, on a second plane spaced apart from the first plane while being parallel to the first plane;
 a first plurality of second conductive lines extending in the first direction on the first plane interposed between the first plurality of first conductive lines, the second conductive lines configured to be a dummy pattern used to provide a uniform appearance for the electromagnetic induction panel structure; and
 a second plurality of second conductive lines extending in the second direction on the second plane interposed between the second plurality of first conductive lines, and wherein the conductive coil is implemented by a first shorted portion of the first plurality of second conductive lines, a second shorted portion of the second plurality of second conductive lines, and conductive vias connecting the first shorted portion and the second shorted portion.

9. The method of claim 8, wherein the stylus pen supports at least one of electro-magnetic resonance (EMR), active electrical stylus (AES), or electric coupled resonance (ECR).

10. The method of claim 8, further comprising:
 receiving a second signal indicating a change of a charging mode of the battery from the stylus pen during the charging of the battery; and
 controlling the charging circuitry to increase a charging speed of the battery based at least partially on the second signal.

11. The method of claim 8, further comprising:
 receiving a third signal having a specified resonance frequency from the stylus pen during the charging of the battery;
 identifying a position of the stylus pen, based at least partially on the third signal; and
 providing a third user interface guiding the position of the stylus pen when the position of the stylus pen is misaligned with the position of the conductive coil.

12. The method of claim 8, further comprising:
 receiving a fourth signal indicating that the charging of the battery is completed, from the stylus pen; and
 controlling the charging circuitry to terminate the charging of the battery based at least partially on the fourth signal.

13. The method of claim 8, wherein the first signal is transmitted from the stylus pen according to a protocol of a Bluetooth standard.

14. A portable communication device comprising:
 a housing including a first plate and a second plate facing in a direction opposite to a direction of the first plate;
 a touchscreen display panel viewable through at least a portion of the first plate and including an electromagnetic induction panel structure configured to detect a stylus pen;
 a wireless communication circuitry disposed inside the housing;
 a conductive coil included in the touchscreen display panel or disposed adjacent to the touchscreen display panel such that, among a plurality of edges of the touchscreen display panel, one edge is most adjacent to the conductive coil, and configured to generate an electromagnetic wave transmitted through the first plate;
 at least one processor operatively connected to the touchscreen display panel, the wireless communication circuitry, and the conductive coil; and
 a memory operatively connected to the processor,
 wherein the memory stores instructions that, when executed, cause the processor to:
  receive a first signal indicating a charging state of a battery from the stylus pen including the battery through the wireless communication circuitry;
  provide a user interface corresponding to charging of the battery, based at least partially on the first signal; and
  apply a current to the conductive coil, in response to detecting that the stylus pen is located at a position corresponding to the conductive coil,
 wherein the user interface is provided adjacent to the one edge to indicate to the user the position corresponding to the conductive coil,
 wherein the electromagnetic induction panel structure includes:
  a first plurality of first conductive lines extending in a first direction on a first plane parallel to the first plate, the first conductive lines configured to be used to detect the stylus pen;
  a second plurality of first conductive lines extending in a second direction perpendicular to the first direction, on a second plane spaced apart from the first plane while being parallel to the first plane;
  a first plurality of second conductive lines extending in the first direction on the first plane interposed between the first plurality of first conductive lines, the second conductive lines configured to be a dummy pattern used to provide a uniform appearance for the electromagnetic induction panel structure; and
  a second plurality of second conductive lines extending in the second direction on the second plane interposed between the second plurality of first conductive lines, and
 wherein the conductive coil is implemented by a first shorted portion of the first plurality of second conductive lines, a second shorted portion of the second plurality of second conductive lines, and conductive vias connecting the first shorted portion and the second shorted portion.

15. The portable communication device of claim 14, wherein the housing further includes a recess longitudinally extending along a side of the housing,
 wherein the stylus pen is detachably inserted into the recess, and wherein the instructions further cause the processor to provide another user interface guiding a user to insert the stylus pen into the recess.

16. The portable communication device of claim 14, further comprising:
a signal processing circuitry configured to process signals transmitted to the stylus pen and/or signals received from the stylus pen,
wherein the instructions further cause the processor to:
transmit a first signal having a first frequency through the signal processing circuitry;
receive a second signal having a second frequency different from the first frequency from the stylus pen; and
identify a position of the stylus pen by processing the second signal having the second frequency using the signal processing circuitry.

\* \* \* \* \*